(12) United States Patent
Buckley et al.

(10) Patent No.: US 11,445,350 B2
(45) Date of Patent: *Sep. 13, 2022

(54) METHOD AND APPARATUS FOR PROVIDING EMERGENCY CODES TO A MOBILE DEVICE

(71) Applicant: BlackBerry Limited, Waterloo (CA)

(72) Inventors: Adrian Buckley, Tracy, CA (US); Jan Hendrick Lucas Bakker, Fort Worth, TX (US)

(73) Assignee: BlackBerry Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/013,304

(22) Filed: Sep. 4, 2020

(65) Prior Publication Data

US 2021/0058761 A1 Feb. 25, 2021

Related U.S. Application Data

(63) Continuation of application No. 16/696,901, filed on Nov. 26, 2019, now Pat. No. 10,771,952, which is a
(Continued)

(51) Int. Cl.
*H04W 4/90* (2018.01)
*H04W 48/14* (2009.01)
*H04W 4/50* (2018.01)

(52) U.S. Cl.
CPC ............ *H04W 4/90* (2018.02); *H04W 4/50* (2018.02); *H04W 48/14* (2013.01)

(58) Field of Classification Search
CPC .......... H04W 4/90; H04W 4/50; H04W 48/14
See application file for complete search history.

(56) References Cited

U.S. PATENT DOCUMENTS 10,165,432 B2 12/2018 Buckley et al.
10,499,234 B2 5/2019 Buckley et al.
(Continued)

FOREIGN PATENT DOCUMENTS

| CN | 102014374 | 4/2011 |
| CN | 102238699 | 11/2011 |
| CN | 105101135 | 11/2015 |

OTHER PUBLICATIONS

3GPP Uniform Resource Identifier (URI) list, 2014, 15 pages.
(Continued)

*Primary Examiner* — Marisol Figueroa
(74) *Attorney, Agent, or Firm* — Fish & Richardson P.C.

(57) ABSTRACT

A method at a user equipment for obtaining emergency codes using a non-Third Generation Partnership Project (3GPP) network, the method including sending a request message to a network node, the request message containing an indication; and receiving, at the user equipment, a response message, the response message including at least one mobile country code (MCC), and the response message indicating an emergency number, type or category information, wherein the emergency number, type or category information is associated with the at least one MCC, and wherein the at least one MCC indicates a portion of a Public Land Mobile Network (PLMN) code to which the emergency number, type or category information applies.

15 Claims, 32 Drawing Sheets

Related U.S. Application Data continuation of application No. 16/220,966, filed on Dec. 14, 2018, now Pat. No. 10,499,234, which is a continuation of application No. 15/714,497, filed on Sep. 25, 2017, now Pat. No. 10,165,432.

(60) Provisional application No. 62/481,053, filed on Apr. 3, 2017.

(56) References Cited

U.S. PATENT DOCUMENTS

| | | | |
|---|---|---|---|
| 10,771,952 B2* | 9/2020 | Buckley | H04W 4/90 |
| 2013/0231073 A1* | 9/2013 | Tiwari | H04M 1/72457 455/404.1 |
| 2014/0233544 A1 | 8/2014 | McCann et al. | |
| 2017/0005914 A1 | 1/2017 | Edge et al. | |
| 2017/0006514 A1* | 1/2017 | Kiss | H04L 45/745 |
| 2017/0332416 A1 | 11/2017 | Kiss et al. | |
| 2020/0092941 A1* | 3/2020 | Song | H04L 65/103 |
| 2020/0100085 A1 | 3/2020 | Buckley et al. | |

OTHER PUBLICATIONS

3GPP, "Access to the 3GPP Evolved Packet Core (EPC) via non-3GPP access networks; Stage 3" TS 24.302 v. 14.3.0, Mar. 17, 2017, 143 pages.

3GPP, "Architecture enhancements for non-3GPP accesses" TS 23.402 v.14.3.0, Mar. 13, 2017, 308 pages.

3GPP, "Characteristics of the Universal Subscriber Identity Module (USIM) application", TS 31.102 v. 14.2.0, Mar. 17, 2017, 287 pages.

3GPP, "General Packet Radio Service (GPRS) enhancements for Evolved Universal Terrestrial Radio Access Network (E-UTRAN) access" TS 23.401 v.14.3.0, Mar. 13, 2017, 386 paages.

3GPP, "General Packet Radio Service (GPRS); Service description; Stage 2" TS 23.060 v. 14.3.0, Mar. 13, 2017, 367 pages.

3GPP, "IP multimedia call control protocol based on Session Initiation Protocol (SIP) and Session Description Protocol (SDP); Stage 3" TS 24.229 v.14.3.1, Mar. 20, 2017, 979 pages.

3GPP, "IP Multimedia Subsystem (IMS) emergency sessions" TS 23.167 v.14.3.0, Mar. 13, 2017, 58 pages.

3GPP, "Mobile radio interface Layer 3 specification; Core network protocols; Stage 3" TS 24.008 v.14.3.0, Mar. 17, 2017, 771 pages.

3GPP, "Mobile radio interface signalling layer 3; General Aspects" TS 24.007 v. 14.0.0, Mar. 17, 2017, 149 pages.

3GPP, "Non-Access-Stratum (NAS) protocol for Evolved Packet System (EPS); Stage 3", TS 24.301 v. 14.3.0, Mar. 17, 2017, 476 pages.

3GPP, "Service aspects; Service principles" TS 22.101 v. 14.6.0, Mar. 17, 2017, 98 pages.

3GPP, "Service requirements for the Internet Protocol (IP) multimedia core network subsystem (IMS); Stage 1" TS 22.228 v.15.0.0, Sep. 30, 2016, 51 pages.

3GPP, "System Architecture for the 5G System" TS 23.501 v.0.3.0, Feb. 28, 2017, 97 pages.

Blackberry UK LTD, "Introduction of handling of Emergency Call Number ANQP-element" 3GPP Draft; C1-170603, vol. CT WG1, No. Dubrovnik, Croatia; Feb. 13-Feb. 17, 2017; Feb. 4, 2017, 8 pages.

Blackberry UK LTD, "Introduction of handling of Emergency Call Number ANQP-element" 3GPP Draft; Cl-171442, vol. CT WG1, No. Spokane (WA), USA; Mar. 3-Mar. 7, 2017; Mar. 26, 2017, 9 pages.

China Mobile et al., "Downloading emerg number from ePDG", 3GPP Draft; S2-172482, vol. SA WG2, No. Busan, Korea; Mar. 27-Mar. 31, 2017; Mar. 30, 2017, 6 pages.

IEEE, "Part 11: Wireless LAN Medium Access Control (MAC) and Physical Layer (PHY) Specifications Amendment 3: Specification for operation in additional regulatory domains", Std 802.11d-2001, 2001, 26 pages.

IEEE, "Part 11: Wireless LAN Medium Access Control (MAC) and Physical Layer (PHY) Specifications", Std 802.11-2012, Mar. 2012, 2794 pages.

IEEE, "Part 11: Wireless LAN Medium Access Control (MAC) and Physical Layer (PHY) Specifications", Std 802.11-2016, Dec. 2016, 3535 pages.

IETF, "A Uniform Resource Name (URN) Namespace for the 3rd Generation Partnership Project (3GPP)" RFC 5279, Jul. 2008, 7 pages.

IETF, "An Extension for EAP-Only Authentication in IKEv2" RFC 5998, Sep. 2010, 16 pages.

IETF, "Augmented BNF for Syntax Specifications: ABNF" RFC 2234, Nov. 1997, 14 pages.

IETF, "DHCP Options and BOOTP Vendor Extensions" RFC 2132, Mar. 1997, 34 pages.

IETF, "Dynamic Host Configuration Protocol for IPv6", RFC 3315, Jul. 2003, 101 pages.

IETF, "Dynamic Host Configuration Protocol" RFC 2131, Mar. 1997, 45 pages.

IETF, "Extensible Authentication Protocol (EAP)" RFC 3748, Jun. 2004, 67 pages.

IETF, "Extensible Authentication Protocol Method for 3rd Generation Authentication and Key Agreement (EAP-AKA)" RFC 4187, Jan. 2006, 79 pages.

IETF, "Extensible Authentication Protocol Method for Global System for Mobile Communications (GSM) Subscriber Identity Modules (EAP-SIM)" RFC 4186, Jan. 2006, 92 pages.

IETF, "Improved Extensible Authentication Protocol Method for 3rd Generation Authentication and Key Agreement (EAP-AKA')" RFC 5448, May 2009, 29 pages.

IETF, "Internet Key Exchange Protocol Version 2 (IKEv2)" RFC 7296, Oct. 2014, 142 pages.

IETF, "UTF-8, a transformation format ofISO 10646" RFC 3629, Nov. 2003, 14 pages.

Intel Deutschland et al., "Managing Local Emergency Numbers List over the non-3GPP access", 3GPP Draft; C1-171922, vol. CT WG1, No. Spokane (WA), USA; Apr. 3-Apr. 7, 2017; Apr. 7, 2017, 9 pages.

International Searching Authority, International Search Report for Application No. PCT/EP/2017/074268, dated Nov. 2, 2017, 19 pages.

Nokia et al., "Handling of emergency call Nos. for emergency session over WLAN access" 3GPP Draft; C1-171310, vol. CT WG1, No. Spokane (WS), USA; Apr. 3-Apr. 7, 2017; Mar. 27, 2017, 3 pages.

Office Action issued in Chinese Application No. 201780090790.9 dated Apr. 6, 2021, 7 pages (With Partial English Translation).

Intel et al., "Managing local Emergency Numbers List over the Non-3GPP Access" 3GPP TSG CT WG1 #103, C1-171540, Mar. 27, 2017, 7 pages.

Intel et al., "Managing local emergency number over the non-3GPP access" Change Request, 3GPP TSG CT WG1 #103, C1-171972, Apr. 7, 2017, 9 pages.

Office Action issued in Japanese Application No. 2020-502766 dated Jul. 28, 2021, 3 pages (With Partial English Translation).

* cited by examiner

H.2.4.1  Information Element Identity (IEI)

Indicates the information element identity. The following values for IEI are defined in this version of the specification:

00000000    PLMN List
00000001    PLMN List with S2a connectivity
00000002    Emergency numbers list
00000003
    To
11111111    Reserved

H.2.4.X    Emergency numbers list IE

The Emergency numbers list information element is used by the WLAN to indicate the emergency numbers available via a PLMN. The format of the PLMN List information element coded according to 3GPP TS 24.007 subclause 11.2.2.1 is shown in Table H.2.4.X-1.

NOTE: the Length of Emergency numbers container contents field below may have to be 2 octets long as opposed to the 1 octet reserved now (in H.2.4.X-1).

FIG. 10A

| | |
|---|---|
| Emergency numbers IEI | octet 1 |
| Length of Emergency numbers container contents | octet 2 |
| Number of Emergency number containers | octet 3 |
| Emergency number container, container 1 | octet 4<br>octet 5 |
| Emergency number container, container N | octet X<br>octet X+1 |

Table H.2.4.X-1: Emergency numbers information element

The "Number of Emergency number containers " (octet 3) contains the number of Emergency number container information items in the list. Bit 7 of octet 3 is the most significant bit and bit 0 of octet 3 the least significant bit.

The Emergency number container is coded as shown in below.

NOTE: the Length of Emergency number container contents field below may have to be 2 octets long as opposed to the 1 octet reserved now (in Table H.2.4.X-2).

| 8 | 7 | 6 | 5 | 4 | 3 | 2 | 1 | |
|---|---|---|---|---|---|---|---|---|
| Length of Emergency number container contents ||||||||  octet 1 |
| Number of PLMN codes |||||||| octet 2 |
| MCC digit 2 |||| MCC digit 1 |||| octet 3 |
| MNC digit 3 (Note 0) |||| MCC digit 3 |||| octet 4 |
| MNC digit 2 (Note 0) |||| MNC digit 1 (Note 0) |||| octet 5 |

FIG. 10B

| | | |
|---|---|---|
| MCC digit 2 | MCC digit 1 | octet 6 |
| MNC digit 3 (Note 0) | MCC digit 3 | octet 7 |
| MNC digit 2 (Note 0) | MNC digit 1 (Note 0) | octet 8 |
| ⋮ | ⋮ | ⋮ |
| Length of 1st Emergency Number information (Note 1) | | octet i |
| Spare 0 0 0 | Emergency Service Category Value | octet i+1 |
| Number digit 2 | Number digit 1 | octet i+2 (Note 2) |
| Number digit 4 | Number digit 3 | octet i+3* |
| ⋮ | ⋮ | ⋮ |
| (Note 3) | | octet j-1* |
| Length of 2nd Emergency Number information (Note 1) | | octet j* |
| Spare 0 0 0 | Emergency Service Category Value | octet j+1* |
| Number digit 2 | Number digit 1 | octet j+2* (Note 2) |
| Number digit 4 | Number digit 3 | octet j+3* |

FIG. 10C

| | | |
|---|---|---|
| ⋮ (Note 3) | ⋮ | ⋮ octet j+k* |
| ⋮ ⋮ ⋮ | | |
| Length of xth Emergency Number information (Note 1) | | octet n* |
| Spare 0 0 0 | Emergency Service Category Value | octet n+1* |
| Number digit 2 | Number digit 1 | octet n+2* (Note 2) |
| Number digit 4 | Number digit 3 | octet n+3* |
| ⋮ | ⋮ | ⋮ |
| (Note 3) | ⋮ | octet n+m* |

FIG. 10D

NOTE 0: If the PLMN code only includes an MCC code, the four bits of the respective digit shall be coded as "1111".
NOTE 1: The length contains the number of octets used to encode the Emergency Service Category Value and the Number digits.
NOTE 2: The number digit(s) in octet 5 precedes the digit(s) in octet 6 etc. The number digit, which would be entered first, is located in octet 5, bits 1 to 4. The contents of the number digits are coded as shown in table 10.5.118/3GPP TS 24.008.
NOTE 3: If the emergency number contains an odd number of digits, bits 5 to 8 of the last octet of the respective emergency number shall be filled with an end mark coded as "1111".

Table H.2.4.X-2 *Emergency Number List* information element

Table H.2.4.X-1: *Emergency Number List* information element

| Emergency Service Category Value (octet 4, j+1, n+1, etc.; bit 1 to 5) Bits 1 to 5 are coded as bits 1 to 5 of octet 3 of the Service Category information element as specified in subclause 10.5.4.33/3GPP TS 24.008. |
|---|

FIG. 10E

Table 5: HS2.0 ANQP-element Subtype Definition

| Element Name | Subtype Value | Description (subclause) | Extensible |
|---|---|---|---|
| Reserved | 0 | n/a | |
| EmergencyNumberList indicator list | 12 | 4.X | |
| Reserved | 13-255 | n/a | |

........

Table 6: HS2.0 ANQP-element Usage

| ANQP-element Name | ANQP-Element (subclause) | ANQP-element type | AP | Mobile Device |
|---|---|---|---|---|
| EmergencyNumberList indicator list | 4.X | S | T | R |

Symbols
Q    element is an ANQP Query
S    element is an ANQP Response
T    ANQP-element may be transmitted by MAC entity
R    ANQP-element may be received by MAC entity Subclause 4.X. EmergencyNumberList indicator list element

FIG. 11A

The EmergencyNumberList indicator list element provides information about EmergencyNumberList indicator information available within the IEEE 802.11 AN. The EmergencyNumberList selection indicator element may include one of more of the following:

- EmergencyNumberList

The format of the EmergencyNumberList indicator list element is provided in Table 4.X.1

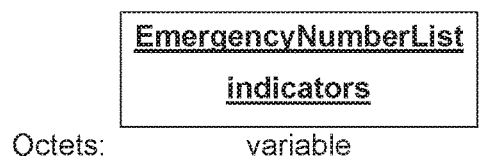

Octets:     variable

Table 4.X.1 – EmergencyNumberList indicator list element format

The EmergencyNumberList Indicators field contains one or more variable length EmergencyNumberList Indicator fields.

The format of each EmergencyNumberList indicator field is provided in Table 4.X.2.

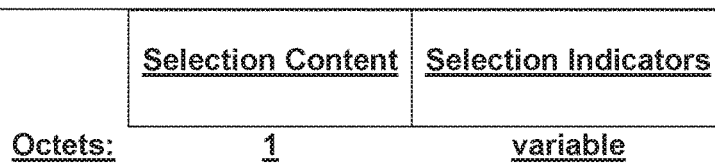

Octets:     1           variable

Table 4.X.2 – EmergencyNumberList selection indicator field format

The Selection Content is a 1-octet subfield whose value indicates what additional information can be found in each Selection Indicator sub-field:

FIG. 11B

| Meaning | bit |
|---|---|
| PLMN ID | 0 |
| Short code (digits) | 1 |
| Short code (alphanumeric) | 2 |
| Short Code (NAI) | 3 |
| Short Code (3gpp container) | 4 |
| Reserved | 5-15 |

The Selection Indicators field contains one or more Selection Indicator 1-octet subfields, each of which corresponds to a set bit within the Selection Content subfield. For example if bits 1 and 3 are equal to 1 within the Selection Content field, then the Selection Indicators field contains the Selection Indicator #2 and Selection Indicator #4 subfields.

The format of the Selection Indicator subfields is defined as follows.

Selection Indicator #2 is a variable length octet subfield. It contains a Shortcode.

| Meaning | Octet |
|---|---|
| Length | 1 |
| Shortcode | variable |

The Shortcode field is defined as below

FIG. 11C

| Spare 0 0 0 | Emergency Service Category Value | octet i+1 |
|---|---|---|
| Number digit 2 | Number digit 1 | octet i+2 (Note 2) |
| Number digit 4 | Number digit 3 | octet i+3* |
| ⋮ | ⋮ | ⋮ |
| (Note 3) | | octet j-1* |

Selection Indicator "Short code (alphanumeric)" is a variable length octet subfield. It contains a 1-octet length field and a SIP URI.

The format of the Selection Indicator "Short Code (NAI)" is same as the frame defined in IEEE 802.11-2016 [12] subsection 9.4.5.10 (NAI Realm), except the Info ID field.

The format of the Selection Indicator "Short Code (3gpp container)" is same as the frame defined in IEEE 802.11-2016 [12] subsection 9.4.5.11 (3GPP Cellular Network), except the Info ID field.

FIG. 11D 6.2.5  EmergencyNumberList configuration

If the UE performs 3GPP-based access authentication, the 3GPP AAA server may send a list of emergency numbers from the non-3GPP access network to the UE during the EAP-AKA or EAP-AKA' based access authentication (i.e. EAP-AKA, EAP-AKA'). The indicator is sent using a AT_EmergencyNumberList_RESP, by extending the EAP-AKA (and EAP-AKA') protocol as specified in subclause 8.2 of IETF RFC 4187. This attribute is provided in EAP-Request/AKA-Challenge or EAP-Request/AKA'-Challenge message payload respectively. The detailed coding of this attribute is described in subclause 8.2.X.1.

6.X A EmergencyNumberList configuration (X is 4 or 5)

6.XA.1      UE Procedures 3-4)   If:

a) the UE supports the "Configuration request";

b) the EAP-Request/AKA'-Challenge message includes the
    AT_EmergencyNumberList_REQUEST_SUPPORTED attribute as described in subclause 8.2.X.1 wherein the message field as described in subclause 8.1.4.1:

1) contains the message type field indicating
      EmergencyNumberList_REQUEST_SUPPORTED; and 2) contains the type field including the EmergencyNumberList Request Supported field_item as described in subclause 8.2.X.1 indicating EmergencyNumberList Supported; and

FIG. 12A c) the UE requests usage of the "EmergencyNumberList";

5-6) then the UE:

a) shall include the AT_EmergencyNumberList_REQUEST attribute according to subclause 8.2.X.2 in the EAP-Response/AKA'-Challenge message. In the message field according to subclause 8.1.4.1 of the AT_EmergencyNumberList_REQUEST attribute, the UE shall:

1) set the message type field to EmergencyNumberList_REQUEST; and 2) contains the type field including the EmergencyNumberList Request field_item as described in subclause 8.2.X.2 indicating EmergencyNumberList requested; and 7-8) Upon receiving the EAP-Request/AKA'-Notification message including the AT_EmergencyNumberList_RESP attribute as described in subclause 8.2.X.3 where the message field as described in subclause 8.1.4.1:

- contains the message type field indicating EmergencyNumberList_RESP; and

- contains the field EmergencyNumberList Encoded;

the UE:

- stores the EmergencyNumberList received to be used to determine if a dialled call is an emergency call.

If this message is received in EAP-AKA' signalling used in tunnel set-up to an ePDG, the received EmergencyNumberList shall be considered an alternative EmergencyNumberList to use by the UE.

6.XA.2    AAA Procedures

The 3GPP AAA server may support EmergencyNumberList configuration.

FIG. 12B 3-4) If the network supports EmergencyNumberList configuration, the 3GPP AAA server shall include a) in the EAP-Request/AKA'-Challenge message, the AT_EmergencyNumberList_REQUEST_SUPPORTED attribute as described in subclause 8.2.X.1, wherein the message field as described in subclause 8.1.4.1:

1) contains the message type field indicating EmergencyNumberList_REQUEST_SUPPORTED; and 2) contains the type field including the EmergencyNumberList Request Supported field_item as described in subclause 8.2.X.1 indicating EmergencyNumberList Supported; and 5-6) If the 3GPP AAA server supports EmergencyNumberList configuration; and the AAA server receives the AT_EmergencyNumberList_REQUEST attribute according to subclause 8.2.X.2 in the EAP-Response/AKA'-Challenge message and In the message field according to subclause 8.1.4.1 of the AT_EmergencyNumberList_REQUEST attribute 1) the message type field is set to EmergencyNumberList_REQUEST; and 2) contains the type field including the "EmergencyNumberList_REQUEST_SUPPORTED" value (see Table 8.1.4.1-2) as described in subclause 8.2.X.2 indicating EmergencyNumberList requested;

then the AAA server optionally contacts an external database e.g. HSS, PCRF to obtain the EmergencyNumberList to be used and provides those EmergencyNumberList in the EAP-RSP/AKA'-identity message.

FIG. 12C 7-8) The AAA sends the EAP-Request/AKA'-Notification message including the AT_EmergencyNumberList_RESP attribute as described in subclause 8.2.X.3 where the message field as described in subclause 8.1.4.1:

- contains the message type field indicating EmergencyNumberList_RESP; and

- contains the field EmergencyNumberList Encoded as described in subclause 8.2.x.3.2;

8      PDUs and parameters specific to the present document 8.1  3GPP specific coding information defined within present document 8.1.4      PDUs for TWAN connection modes 8.1.4.1        Message The message is coded according to table 8.1.4.1-2.

Table 8.1.4.1-2: Message type

The value is coded as follows.

| 7 | 6 | 5 | 4 | 3 | 2 | 1 | 0 | |
|---|---|---|---|---|---|---|---|---|
| 0 | 0 | 0 | 0 | 0 | 0 | 0 | 1 | CONNECTION_CAPABILITY |
| 0 | 0 | 0 | 0 | 0 | 0 | 1 | 0 | SCM_REQUEST |
| 0 | 0 | 0 | 0 | 0 | 0 | 1 | 1 | SCM_RESPONSE |
| 0 | 0 | 0 | 0 | 0 | 1 | 0 | 0 | MCM_REQUEST |
| 0 | 0 | 0 | 0 | 0 | 1 | 0 | 1 | MCM_RESPONSE |
| 0 | 0 | 0 | 0 | 0 | 1 | 1 | 1 | EmergencyNumberList_REQUEST_SUPPORTED |
| 0 | 0 | 0 | 0 | 1 | 0 | 0 | 0 | EmergencyNumberList_REQUEST |

8.2.X Identity attributes 8.2.X.1        AT_EmergencyNumberList_Request_Supported attribute

FIG. 12D

|   | 7 | 6 | 5 | 4 | 3 | 2 | 1 | 0 | |
|---|---|---|---|---|---|---|---|---|---|
| Attribute Type = AT_EmergencyNumberList_request supported | | | | | | | | | octet 1 |
| Length = 1 | | | | | | | | | octet 2 |
| Value | | | | | | | | | octet 3 |
| | | | | | | | | | octet 4 |

Table 8.2.X.1-1: AT_EmergencyNumberList_Request Supported attribute

Table 8.2.X.1-1: : AT_EmergencyNumberList_Request Supported

Octet 1 (in Table 8.2.X.1-1) indicates the type of attribute as AT_EmergencyNumberList_Request Supported.

Octet 2 (in Table 8.2.X.1-1) is the length of this attribute which shall be set to 1 as per IETF RFC 4187

Octets 3 (in Table 8.2.X.1-1) and 4 (in Table 8.2.X.1-1) are the value of the attribute. Octet 3 (in Table 8.2.X.1-1) is reserved and shall be coded as zero. Octet 4 (in Table 8.2.X.1-1) shall be set as follows. All other values are reserved.

FIG. 12E

| 7 | 6 | 5 | 4 | 3 | 2 | 1 | 0 | EmergencyNumberList Request Supported field |
|---|---|---|---|---|---|---|---|---|
| 0 | 0 | 0 | 0 | 0 | 0 | 0 | 1 | EmergencyNumberList Request Supported |
| 0 | 0 | 0 | 0 | 0 | 0 | 1 | 0 | EmergencyNumberList Request not supported |
| 1 | 1 | 1 | 1 | 1 | 1 | 1 | 1 | Reserved |

8.2.X.2  AT_EmergencyNumberList_Request attribute

| 7 | 6 | 5 | 4 | 3 | 2 | 1 | 0 | |
|---|---|---|---|---|---|---|---|---|
| Attribute Type = AT_EmergencyNumberList_Request | | | | | | | | octet 1 |
| Length = 1 | | | | | | | | octet 2 |
| Value | | | | | | | | octet 3 / octet 4 |

Table 8.2.X.2-1: AT_EmergencyNumberList_Request attribute

Table 8.2.X.2-1: : AT_EmergencyNumberList_Request attribute

Octet 1 (in Table 8.2.X.2-1) indicates the type of attribute as AT_EmergencyNumberList_Request with a value of 1XX.

Octet 2 (in Table 8.2.X.2-1) is the length of this attribute which shall be set to 1 as per IETF RFC 4187 [33]

FIG. 12F

Octet 3 (in Table 8.2.X.2-1) and 4 (in Table 8.2.X.2-1) is the value of the attribute. Octet 3 (in Table 8.2.X.2-1) is reserved and shall be coded as zero. Octet 4 (in Table 8.2.X.2-1) shall be set as follows. All other values are reserved.

| 7 | 6 | 5 | 4 | 3 | 2 | 1 | 0 | EmergencyNumberList requested field |
|---|---|---|---|---|---|---|---|---|
| 0 | 0 | 0 | 0 | 0 | 0 | 0 | 1 | EmergencyNumberList requested |
| 0 | 0 | 0 | 0 | 0 | 0 | 1 | 0 | Reserved to |
| 1 | 1 | 1 | 1 | 1 | 1 | 1 | 1 | Reserved |

8.2.X.3  AT_EmergencyNumberList_RESP attribute

8.2.X.3.1  General

| 7 | 6 | 5 | 4 | 3 | 2 | 1 | 0 | |
|---|---|---|---|---|---|---|---|---|
| Attribute Type = AT_EmergencyNumberList_RESP ||||||||| octet 1 |
| Length = 1 ||||||||| octet 2 |
| Value ||||||||| octet 3 / octet Z |

Table 8.2.X.3-1: AT_EmergencyNumberList_RESP attribute

8.2.x.3.2  EmergencyNumberList encoded

There may be multiple EmergencyNumberLists encoded in the AT_EmergencyNumberList_RESP attribute.

FIG. 12G

|   | 7 | 6 | 5 | 4 | 3 | 2 | 1 | 0 |   |
|---|---|---|---|---|---|---|---|---|---|
| | EmergencyNumberList encoded ||||||||octet 1|
| | Length = 1 ||||||||octet 2|
| | EPDG ||||||||octet 3 / octet Z|

Table 8.2.X.3-1: AT_EmergencyNumberList RESP attribute Value

Table 8.2.X.3-1: : AT_EmergencyNumberList_RESP attribute Value

Octet 1 (in Table 8.2.X.3-1) indicates the identity that is encoded.

Octet 1 (in Table 8.2.X.3-1) shall be set as follows. All other values are reserved.

| 7 | 6 | 5 | 4 | 3 | 2 | 1 | 0 | EmergencyNumberList Encoded field |
|---|---|---|---|---|---|---|---|---|
| 0 | 0 | 0 | 0 | 0 | 0 | 0 | 1 | EmergencyNumberList UTF-8 Encoded EmergencyNumberList as define in |
| 0 | 0 | 0 | 0 | 0 | 0 | 1 | 0 | Section H.2.4.X (above) |
| 0 | 0 | 0 | 0 | 0 | 0 | 1 | 1 | Reserved to |
| 1 | 1 | 1 | 1 | 1 | 1 | 1 | 1 | Reserved |

8.2.x.3.3     EmergencyNumberList

The EmergencyNumberList field is an octet string encoded according to UTF-8 encoding rules containing an SIP or Tel URI.

FIG. 12H

2. EmergencyNumberList Option for DHCPv4

This section describes an EmergencyNumberList option for DHCPv4. The option layout is depicted below:

```
 0 1 2 3 4 5 6 7 8 9 0 1 2 3 4 5 6 7 8 9 0 1 2 3 4 5 6 7 8 9 0 1
                                +-+-+-+-+-+-+-+-+-+-+-+-+-+-+-+-+
                                | Option Code   |    Length     |
+-+-+-+-+-+-+-+-+-+-+-+-+-+-+-+-+-+-+-+-+-+-+-+-+-+-+-+-+-+-+-+-+
|                       EmergencyNumberList                     |
+-+-+-+-+-+-+-+-+-+-+-+-+-+-+-+-+-+-+-+-+-+-+-+-+-+-+-+-+-+-+-+-+
 .                                                             .
+---------------------------------------------------------------+
```

Option Code
    EmergencyNumberList (XXX)

Length
    Length (in bytes) of the option excluding the 'Option Code' and the 'Length' fields; 'Length' field is set to 4N, where N is the number of IPv4 addresses carried in the option EmergencyNumberList
as defined in Section H.2.4.X (in tables above)

3. EmergencyNumberList Option for DHCPv6

This section describes a shortcode option for DHCPv6. All values in the option are represented in network byte order. The option layout is depicted below:

FIG. 13A

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       Option Code             |            Length              |
+-+-+-+-+-+-+-+-+-+-+-+-+-+-+-+-+-+-+-+-+-+-+-+-+-+-+-+-+-+-+-+-+
|                        EmergencyNumberList                     |
                              .
                              .
+---------------------------------------------------------------+
```

Option Code

EmergencyNumberList (YYY)

Length

Length (in bytes) of the option excluding the 'Option Code' and the 'Length' fields; 'Length' field is set to 16N, where N is the number of IPv6 addresses carried in the option EmergencyNumberList as defined in Section H.2.4.X (in tables above.

4.1. Usage of Shortcode Options for DHCPv4

The requesting and sending of the proposed DHCPv4 options follow the rules for DHCP options in [RFC2131].

4.1.1. Mobile Node Behavior

The mobile node MAY request an EmergencyNumberList either during initial association with a network or when the mobile node determines that it needs an EmergencyNumberList. It MAY also request an EmergencyNumberList when the network

FIG. 13B information is outdated or the mobile node does not have any
EmergencyNumberList
information.

In order to request an EmergencyNumberList, the mobile node
(DHCP client) MUST include an EmergencyNumberList IPv4 Address Option
in the
Parameter Request List (PRL) in the respective DHCP messages as
defined in [RFC2131] and [RFC2132]. The DHCP client MAY initiate a
new DHCP exchange or piggyback on other DHCP message exchanges.
DHCP
client-handling PRL options are specified in [RFC2131], Section 4.4.

4.2. Usage of EmergencyNumberList Options for DHCPv6
The requesting and sending of the proposed DHCPv6 options follow the
rules for DHCP options in [RFC3315].

4.2.1. Mobile Node Behavior
The mobile node MAY request an EmergencyNumberList
according to the scenarios described in Section 4.1.1.

In order to discover an EmergencyNumberList, the mobile node
(DHCP client) MUST include an EmergencyNumberList Option in the Option
Request Option (ORO) in the respective DHCP messages as defined in
[RFC3315]. The DHCP client MAY initiate a new DHCP exchange or
piggyback on other DHCP message exchanges. DHCP client-handling ORO
options are specified in [RFC3315], Sections 17.1 and 18.1.

FIG. 13C 4.12.2 Initial Registration via an untrusted non-3GPP Access

This clause specifies how a UE can register to a 5G core network via an untrusted non-3GPP access network when the UE does not have a valid security context for this network, i.e. when the UE has not previously registered with this network. It is based on the registration procedure specified in clause 4.2.2.2.

The procedure shown below shall be initiated by the UE when it selects an N3IWF in a PLMN for which the UE does not have a valid security context. When the UE selects an N3IWF in a PLMN for which the UE has a valid security context, the UE shall initiate instead the procedure specified in clause 4.12.2a.

1. The UE connects to an untrusted non-3GPP access network with procedures defined outside the scope of 3GPP and is assigned an IP address. Any non-3GPP authentication method can be used, e.g. no authentication (in case of an open-authentication WLAN), EAP with pre-shared key, username/password, etc. When the UE decides to attach to a 5G core network, the UE discovers the IP address of N3IWF in a 5G PLMN as described in TS 23.501 [2], clause TBD.

2. The UE proceeds with the establishment of an IPsec SA with the N3IWF by initiating the IKEv2 signalling procedure according to RFC 7296 [3] and RFC 5998 [4]. After step 2a all subsequent IKEv2 messages are encrypted and integrity protected. In step 2b the UE shall include a UE identity (e.g. Permanent User Id or Temporary User Id) but shall not include the AUTH payload in order to trigger an EAP-based authentication, as specified in RFC 7296 [3]. The N3IWF behaves as an EAP authenticator and retrieves the Network Access Identifier (NAI) [5] of the UE in steps 2c, 2d. In step 2d the UE may include a 3GPP-specific Vendor Id (VID) payload which contains registration parameters, such as a registration type (defined in clause 4.2.2.2.2), and network slice selection

FIG. 14A information (NSSAI). The NSSAI is specified in TS 23.501 [2], clause 5.15, and is optionally included in the registration parameters.

3......

Editor's note: It is FFS if GRE encapsulation for NAS messages is required.

7. Via the established signalling IPsec SA, the N3IWF shall send to the UE the NAS SMC Request received from the AMF in step 6b optionally including a list of emergency numbers using the format as described in X. The emergency numbers may be associated with the Network Slice (e.g. the SST) the UE has registered with. The UE responds with a NAS SMC Complete message, which shall be forwarded by the N3IWF to the AMF within an N2 UL NAS Transport message.

8. The AMF shall send a NAS Registration Accept message to the N3IWF, within an N2 Initial Context Setup Request, which shall be forwarded to the UE via the established signalling IPsec SA. Finally, the UE shall respond with a NAS Registration Complete message which shall be forwarded by the N3IWF to the AMF within an N2 Initial Context Setup Response.

Note: The Network slice could be indicated by the inclusion of S-NSSAI

FIG. 14B

3GPP TS 24.008

Section 10.5.6.3 Protocol configuration options

....

Table 10.5.154/3GPP TS 24.008: *Protocol configuration options* information element Configuration protocol (octet 3)

Bits 3 2 1

0 0 0    PPP for use with IP PDP type or IP PDN type (see 3GPP TS 24.301 [120])

All other values are interpreted as PPP in this version of the protocol.

After octet 3, i.e. from octet 4 to octet z, two logical lists are defined:

- the Configuration protocol options list (octets 4 to w), and
- the Additional parameters list (octets w+1 to z).

Configuration protocol options list (octets 4 to w)

........

....

MS to network direction:

....

- 0010H (IPv4 Link MTU Request);
- 0011H (MS support of Local address in TFT indicator); and
- 0012H (emergencynumberlist); and
- FF00H to FFFFH reserved for operator specific use.

Network to MS direction:

......

- 0010H (IPv4 Link MTU);
- 0011H (Network support of Local address in TFT indicator); and
- 0012H *emergencynumberlist*;
- 
- FF00H to FFFFH reserved for operator specific use.......

FIG. 15

METHOD AND APPARATUS FOR PROVIDING EMERGENCY CODES TO A MOBILE DEVICE

CROSS REFERENCE TO RELATED APPLICATION

This application is a continuation of and claims the benefit of U.S. Non-Provisional application Ser. No. 16/696,901, filed Nov. 26, 2019, which claims the benefit of U.S. Non-Provisional application Ser. No. 16/220,966, filed Dec. 14, 2018, which claims the benefit of U.S. Non-Provisional application Ser. No. 15/714,497, filed Sep. 25, 2017, which claims the benefit of U.S. Provisional Application No. 62/481,053, filed on Apr. 3, 2017, the entire contents of which are hereby expressly incorporated by reference herein in their entireties.

FIELD OF THE DISCLOSURE

The present disclosure relates to emergency calling, and in particular relates to identification of appropriate emergency calling numbers and categories or types.

BACKGROUND

When a third generation partnership project (3GPP) device or user equipment (UE) desires to access an Evolved Packet Core (EPC)/Evolved Packet System (EPS) core via an access network that is not a 3GPP defined access network (where a 3GPP access network could be a Global System For Mobile Communications (GSM) EDGE Radio Access Network (GERAN), Universal Terrestrial Radio Access Network (UTRAN) or Evolved Universal Mobile Telecommunications Service (UMTS) Terrestrial Radio Access Network (E-UTRAN)), the UE may need to select and then establish a connection with an Wireless Local Area Network (WLAN). Various aspects and predicates exist for a UE to access an WLAN and obtain a list of emergency codes that can be trusted. These may include trusted access, non-trusted access, Extensible Authentication Protocol (EAP), Protocol Configuration Options (PCO), Voice over Wi-Fi, UE detected emergency calls, Dynamic Host Configuration Protocol (DHCP), WLAN Access Network Query Protocol (WLAN ANQP), Fifth generation (5G) network, emergency numbers via WLAN and policy using a Non-Access Spectrum (NAS) indicator via a 3GPP Access Network (AN), or Emergency numbers via 3GPP Access Network.

Networks need to provide emergency numbers and types or categories (e.g. fire, ambulance, police, mountain rescue, etc.) for which "UE detected emergency calls" are supported by the network or public land mobile network (PLMN) via a (Trusted or untrusted) WLAN. Different countries support different emergency numbers and types and categories, and "UE detected emergency calls". Further, even in the same country, different PLMNs may support different "UE detected emergency calls".

A UE connected to different PLMNs via 3GPP access and WLAN access may be configured by both (i.e. first and second) PLMNs with emergency call numbers and types or categories.

When the UE has been configured with a second PLMN's emergency numbers and types or categories via WLAN, and the UE uses these to initiate a "UE detected emergency call" via, for example, 3GPP access where the serving network is a first PLMN, then first PLMN may receive a "UE detected emergency call" for a type/category for which it hasn't configured its network.

Instead, the first PLMN would have expected to receive a normal call. The normal call request message would include dialed digits. The network would then parse the dialed digits and possibly route the call to the correct public safety answering point (PSAP) based on the dialed digits. A "UE detected emergency call" request message, however, need not include dialed digits.

Further, when emergency numbers are provided to a UE via WLAN, they may be provided before a UE is connected to a PLMN. When more than one PLMN is available, there is no mapping of emergency numbers to those PLMNs. Alternatively, the entity providing emergency numbers that are provided to a UE via WLAN may not know or may not be able to predict to which PLMN the UE will successfully connect via WLAN. An example of such an entity is an ANQP server or an Access Point (AP).

A fifth generation (5G) network can have many network slices, including but not limited to Internet of Things (IoT), voice, among others. Each slice may have its own set of emergency numbers. For example, one number may be 911 for voice and a second number may be 811 for automated IoT devices. There is no way for a multi-purpose device to know which emergency number to use for a particular slice.

BRIEF DESCRIPTION OF THE DRAWINGS

The present disclosure will be better understood with reference to the drawings, in which:

FIGS. 10A-10E represent changes to the definition of the generic container within 3GPP TS 24.302, shown in bold and underlining;

FIGS. 11A-11D represent example changes to the Wi-Fi Alliance Hotspot 2.0 (Release 2) Technical Specification version 1.2.5, shown in bold and underlining;

FIGS. 12A-12H show one example potential modification to a specification in bold and underlining, section numbers and references are those in that specification;

FIGS. 13A, 13B and 13C are proposed modifications to RFC 2132;

FIGS. 14A and 14B show in bold (item 7) changes that adds text to 3GPP TS 23.501; and FIG. 15 is proposed modifications to 3GPP TS 24.008.

DETAILED DESCRIPTION

Figure 1:
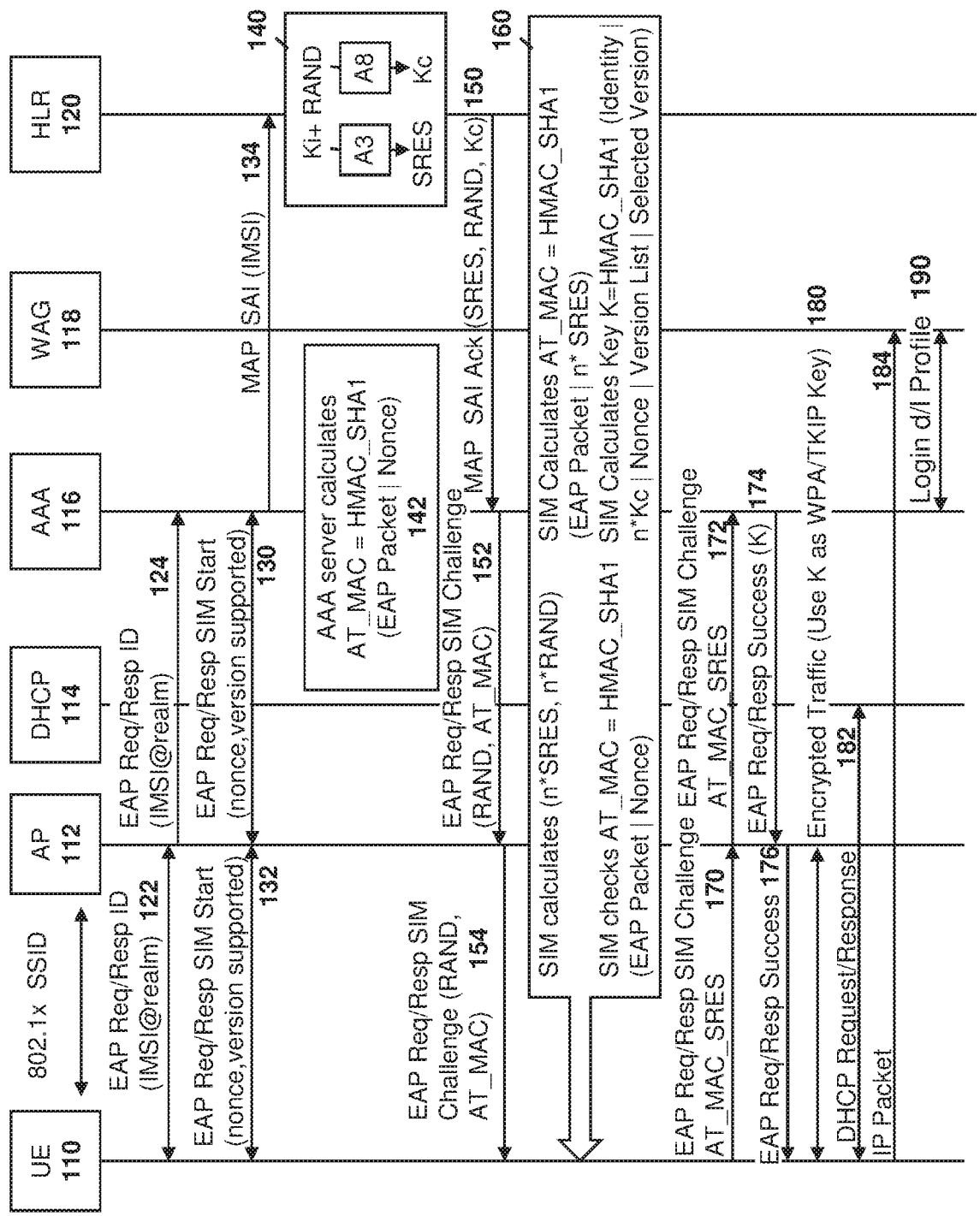
FIG. 1 is a data flow diagram showing EAP SIM.

The present disclosure provides a method at a user equipment for obtaining emergency codes, the method comprising: sending a request message to a network node, the request message containing an indication; and receiving, at the user equipment, a response message, the response message including one or more lists of emergency numbers, wherein the one or more lists of emergency numbers are each associated with a country code.

The present disclosure further provides user equipment configured to obtain emergency codes, the user equipment comprising: a processor; and a communications subsystem, wherein the user equipment is configured to: send a request message to a network node, the request message containing an indication; and receive a response message, the response message including one or more lists of emergency numbers, wherein the one or more lists of emergency numbers are each associated with a country code.

The present disclosure further provides a non-transitory computer readable medium for storing instruction code for obtaining emergency codes, where the instruction code, when executed by a processor of a user equipment causes the user equipment to: send a request message to a network node, the request message containing an indication; and receive a response message, the response message including one or more lists of emergency numbers, wherein the one or more lists of emergency numbers are each associated with a country code.

The present disclosure further provides a method at a user equipment comprising: sending a request message to a network node, the request message containing an indication; and receiving, at the user equipment, a response message, the response message including a uniform resource name including an empty emergency number list along with a country code.

The present disclosure further provides a user equipment comprising: a processor; and a communications subsystem, wherein the user equipment is configured to: send a request message to a network node, the request message containing an indication; and receive a response message, the response message including a uniform resource name including an empty emergency number list along with a country code.

The present disclosure further provides a non-transitory computer readable medium for storing instruction code which, when executed by a processor of a user equipment, causes the user equipment to: send a request message to a network node, the request message containing an indication; and receive a response message, the response message including a uniform resource name including an empty emergency number list along with a country code.

In accordance with the embodiments described below, Table 1 provides one example definition of the terminology used herein:

TABLE 1

Terminology

| Term | Brief Description |
| --- | --- |
| RPLMN | Registered PLMN, this is the PLMN that the UE has successfully attached to. It can be either VPLMN or a HPLMN. |
| VPLMN | This is a PLMN whose Mobile Country Code, Mobile Network Code does not match the MCC, MNC stored in either $EF_{IMSI}$ or $EF_{EHPLMN}$ both of which are specified in 3GPP TS 31.102, "Characteristics of the Universal Subscriber Identity Module (USIM) application", v.14.2.0, March 2017. |
| HPLMN | This is a PLMN whose Mobile Country Code, Mobile Network Code does match the MCC, MNC stored in either $EF_{IMSI}$ as specified in 3GPP TS 31.102. Other potential HPLMNs can be EHPLMNs and EPLMNs. |
| EHPLMN | This is a PLMN that is equivalent to the HPLMN. The identities are stored in $EF_{EHPLMN}$ which is specified in 3GPP TS 31.102 |
| EPLMN | Equivalent PLMN. These are PLMNs that are equivalent to the RPLMN. The identities are received in an Attach Accept from the RPLMN. |
| Network slice | The Network Slice is a complete logical network that comprises a set of network functions and corresponding resources necessary to provide certain network capabilities and network characteristics. It includes both 5G-AN and 5G CN. A Network Slice Instance (NSI) is the Instantiation of a Network Slice, i.e. a deployed set of network functions delivering the intended Network Slice Services according to a Network Slice Template<br>A Network Slice provides a logical network that may include:<br>the Core Network control plane and user plane Network Functions,<br>the 5G Radio Access Network<br>the Non-3GPP Interworking Function (N3IWF) functions to the non-3GPP Access Network.<br>Network slices may differ for supported features and network functions optimisations. The operator may deploy multiple Network Slice instances delivering exactly the same features but for different groups of UEs, e.g. as they deliver a different committed service and/or because they may be dedicated to a customer.<br>A single UE can simultaneously be served by one or more Network Slice instances via a 5G-AN. The Access and Mobility Management function (AMF) instance serving the UE logically belongs to each of the Network Slice instances serving the UE, i.e. this AMF instance is common to the Network Slice instances serving a UE.<br>The AMF discovery and selection for the set of slices for a UE is triggered by the first contacted AMF in a registration procedure and it may lead to change of AMF. SMF discovery and selection is initiated by the AMF when a Session Management message to establish a PDU session is received from the UE. The Network Repository Function (NRF) is used to assist the discovery and selection tasks. |

TABLE 1-continued

Terminology

| Term | Brief Description |
|---|---|
| | A PDU session belongs to one and only one specific Network Slice instance per PLMN. Different Network Slice instances do not share a PDU session, though different slices may have slice-specific PDU sessions using the same Data Network Name (DNN). 5.15.2 Identification and selection of a Network Slice: The S-NSSAI and the NSSAI An S-NSSAI (Single Network Slice Selection Assistance information) identifies a Network Slice. An S-NSSAI is comprised of: A Slice/Service type (SST), which refers to the expected Network Slice behaviour in terms of features and services; A Slice Differentiator (SD), which is optional information that complements the Slice/Service type(s) to allow further differentiation for selecting an Network Slice instance from the potentially multiple Network Slice instances that all comply with the indicated Slice/Service type. This information is referred to as SD. |
| N3IWF | A 5G function that can be equated to an ePDG. |
| AMF | Access and Mobility Management function, a 5G term similar to an MME. |

As provided above, various aspects and predicates exist for a UE to access a WLAN and obtain a list of emergency codes that can be trusted. Examples of such aspects and predicates are provided below.

Trusted Access

Trusted access may also be known as S2a access. The UE performs WLAN Access Authentication and Authorization (AAA). In this step the UE may receive a trust indicator from the network in the EAP signalling that is used as part of the Authentication and Authorisation step. If the trust indicator indicates the network is trusted, the UE uses trusted network access procedures. For example, in one case such trusted network access procedures are described in 3GPP Technical Specification (TS) 24.302, "Architecture Enhancements For Non-3GPP Accesses", as for example provided in v.14.3.0, March 2017.

Non-Trusted Access

Non-trusted access may also be known as S2b access. Once the UE has connected to a WLAN and IP connectivity has been established on the connected-to WLAN (e.g. an IP address has been obtained e.g. using DHCP), then the UE sets up an Internet Protocol Security (IPsec) tunnel to a network function or network element called an evolved packet data gateway (ePDG). The ePDG terminates/acts as an end point to the IPsec tunnel and selects a Packet Data Network Gateway (P-GW), for example based on a parameter provided by the UE.

In connecting to the WLAN and before establishing IP connectivity, the UE may perform WLAN Access Authentication and Authorisation using EAP signalling, as described below, or by other means such as, for example, splash screens or a captive portal, a Wi-Fi Alliance Passpoint, pre-shared key, username/password which may for example use a AAA/RADIUS/Diameter server, among other options.

EAP

The Extensible Authentication Protocol, as the name suggests, is an extensible authentication framework. It provides the necessary tools to incorporate other authentication schemes into the basic messaging structure. There are numerous different EAP mechanisms defined. EAP is, for example, described in the Internet Engineering Task Force (IETF) Request for Comments (RFC) 3748, "Extensible Authentication Protocol (EAP)", June 2004. A diagrammatic view of how the EAP framework can be used in a cellular device can be seen in FIG. 1.

Reference is now made to FIG. 1. In the embodiment of FIG. 1, a UE 110 includes a mobile equipment (ME) as well as a SIM. UE 110 communicates with access point (AP) 112, for example utilizing an 802.1x Service Set Identifier (SSID).

Further, access point 112 may communicate with network elements, including DHCP Sever 114, AAA Server 116, WLAN Access Gateway (WAG) 118, and Home Location Registry (HLR) 120. DHCP Server 114 will be understood by those in the art to be a note implementing DHCP protocol. Similarly, AAA Server 116 will be understood by those in the art to be a note implementing AAA protocol.

Registration starts by an Extensible Authentication Protocol (EAP) Req/Resp ID message 122 being sent between the UE 110 and AP 112. Message 122 may include an identifier such as the International Mobile Subscriber Identity (IMSI) which may be associated with a realm.

AP 112 then forwards message 122 to AAA 116, as shown by message 124.

On receipt of message 124, the AAA 116 and AP 112 exchange an EAP Req/Resp SIM Start message 130 which may include a nonce and a version support.

AP 112 may then forward message 130 to UE 110, shown as message 132.

AAA 116 may further send a Mobile Application Part (MAP) Send Authentication Information (SAI) (IMSI) message 134 to HLR 120.

Based on message 134, HLR 120 generates keys, as shown by block 140.

Further, AAA 116 may calculate the AT_MAC=HMAC_SHA1 (EAP Packet|Nonce), as shown at block 142.

HLR 120 provides the keys back to AAA 116 as a MAP SAI Ack (SRES, RAND, Kc) message 150.

AAA 116 then provides an EAP Req/Resp SIM Challenge message 152, including the RAND and the AT_MAC calculator at block 142 to AP 112.

Message 152 is then forwarded to UE 110 as message 154.

The SIM on UE 110 may then calculate encryption parameters, as shown by block 160 and may provide a response 170 back to AP 112. The response 170 may include the AT_MAC_SRES.

The response 170 is then forwarded by AP 112 to AAA 116, as shown by message 172.

On checking the response 172, AAA 116 may then send an EAP Req/Resp Success message 174 to AP 112. Message 174 may include a key (K).

Message 174 is then forwarded by AP 112 to UE 110 as message 176 in the embodiment of FIG. 1.

Subsequently, encrypted traffic may be passed between UE 110 and AP 112 using K as the WPA/TKIP Key, as shown with arrow 180.

UE 110 may then provide a DHCP Request/Response 182 to DHCP 114.

UE 110 may then provide IP Packet 184 to WAG 118.

Subsequently, a Login d/I Profile 190 may be exchanged between WAG 118 and AAA 116.

3GPP defines three EAP methods that can be used in a UE. A first is EAP-Authentication and Key Agreement (AKA), described for example in IETF RFC 4187, *"Extensible Authentication Protocol Method for 3rd Generation Authentication and Key Agreement (EAP AKA)"*, January 2006. A second is EAP-Subscriber Identity Module (SIM), described for example in IETF RFC 4186, *"Extensible Authentication Protocol Method for GSM Subscriber Identity Modules (EAP-SIM)"*, January 2006. A third is EAP-AKA', described for example in IETF RFC 5448, *"Improved Extensible Authentication Protocol Method for 3rd Generation Authentication and Key Agreement (EAP-AKA')"*, May 2009.

The EAP-SIM authentication mechanism has been generally considered by the experts in the subject area to have been compromised and therefore no longer safe to use, so only EAP-AKA and EAP-AKA' are typically used to access an EPC/EPS core network.

Once EAP authentication has been successful, the UE can then establish IP connectivity from the Wi-Fi network e.g. using DHCP. Once IP connectivity has been established on the Wi-Fi network, an ePDG can then be selected.

Within the EAP procedure, it is possible to provide configuration parameters to the UE, which includes PCO as described below.

Protocol Configuration Options (PCO)

PCO is a general name given to a capability first used in GSM Packet Radio Service (GPRS). It allows a device, via several indicators (wherein an indicator can consist of one or more bits or even the absence of one or more bits in a message), to indicate to the network some information that the UE requires. The network would then respond back with information pertaining to the requested information and/or information not requested. The request and response mechanism is called PCO.

This capability was later extended to UTRAN and Long Term Evolution (LTE)/E-UTRAN, and then also WLAN networks via EAP signalling connection establishment. Some data types a UE can request and be provided with are described, for example, in 3GPP TS 24.008, "Mobile radio interface Layer 3 specification; Core network protocols; Stage 3", v. 14.3.0, March 2017, subsection 10.5.6.3. Examples include Proxy Call Session Control Function (P-CSCF) addresses, Network Based IP Flow Mobility (NBIFOM) mode, IP flow mobility (IFOM) support, among other options.

PCO is defined in 3GPP TS 24.008, subclause 6.1.3.7, and further in 3GPP 24.301, "Non-Access-Stratum (NAS) protocol for Evolved Packet System (EPS); Stage 3", v.14.3.0, March 2017, subclause 6.6.1 and 3GPP TS 24.302, subclauses 6.9 and 6.4.3.5.2. In 3GPP accesses (e.g. GERAN, UTRAN, E-UTRAN) the PCO information comes from a Gateway GPRS Support Node (GGSN), or P-GW. The GGSN or P-GW can be located in the Visited Public Land Mobile Network (VPLMN) or Home Public Land Mobile Network (HPLMN). The GGSN or P-GW may be configured with the information (e.g. via operator O&M procedures) or the information may be obtained by some other means.

Voice Over Wi-Fi

Prior to the UE attempting a Voice over WiFi (VoWiFi) call, the device may have selected an ePDG to access the EPC network that will connect to the IP Multimedia System (IMS) network. After ePDG selection has been performed, the UE then creates a tunnel to the selected ePDG, and eventually performs an IMS/SIP REGISTRATION, as for example described in 3GPP TS 24.229, *"IP multimedia call control protocol based on Session Initiation Protocol (SIP) and Session Description Protocol (SDP); Stage 3"*, v.14.3.1, March 2017. The registration is performed with an IMS network that connects to the EPC network. After the IMS REGISTRATION has completed, the UE can make a voice call at any time. When the call is detected to be an emergency call, dedicated emergency call procedures may be executed. The dedicated emergency call procedures differ from procedures for calls not detected to be emergency calls. At the UE, two types emergency call procedures exist: UE detected emergency calls and network detected emergency calls".

UE Detected Emergency Calls

It is possible for a UE to detect, e.g. based upon either digits entered or selected or a session initiation protocol (SIP)/telephony (TEL) uniform resource identifier (URI) being selected, that a call is an emergency call. This detection is performed by configuring the UE, e.g. with those numbers. This configuration can be performed either:
 a) within the mobile equipment (ME) or universal subscriber identity module (USIM)
 b) by the access network providing them.
   a. In Attach Accept (e.g. see 3GPP TS 24.008 or 3GPP TS 24.302) if using 3GPP access; or
   b. Via domain name system (DNS) or access network query protocol (ANQP), as described below, if using non 3GPP access.

It is possible that the UE obtains this provisioning information from many sources. In such case the dynamic information takes precedence. If dynamic information is received from both 3GPP and non 3GPP access networks, requirements have been defined that a registered PLMN (RPLMN) can provide a policy to indicate if both sets of provisioning information (e.g. numbers and types) can be used.

Network Detected Emergency Calls

It is possible that the network detects the call is an emergency call. The network may inform the UE and the UE may initiate an emergency call in response to the network informing the UE.

Dynamic Host Configuration Protocol (DHCP)

DHCP is used in an IP network in order to dynamically configure network hosts with data/parameters, such as IP addresses, DNS servers, default gateway, among other options. The message flow for DHCP is shown in FIG. 2.

Figure 2:
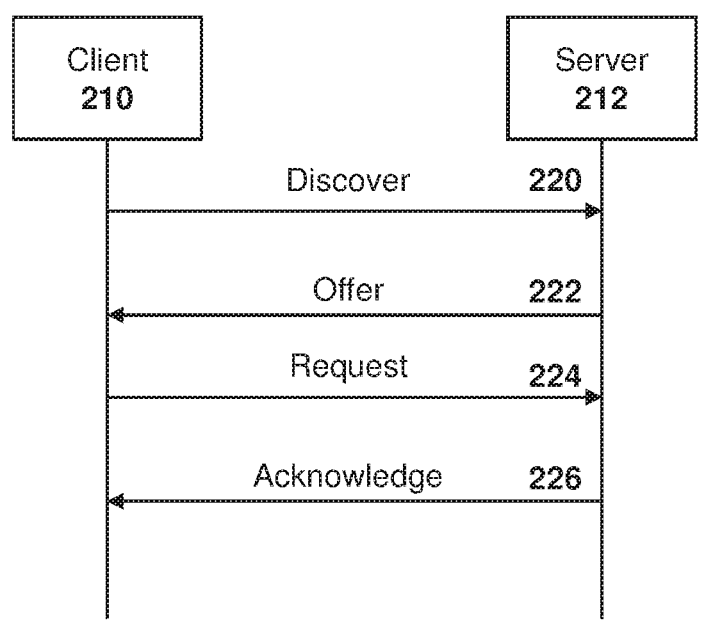
FIG. 2 is a data flow diagram showing DHCP message flow.

As seen in FIG. 2, a client 210 communicates with a server 212.

In message 220, the DHCP client 210 (which may reside or be hosted on a UE) broadcasts a Discover message to the connected-to network (e.g. sends it to an IPv4 address of 255.255.255.255).

One or more DHCP servers 212 may respond to the client with a DHCP Offer message 222, which contains one or more parameters, such as an IP address.

In response to one of the DHCP Offers the client 210 receives, the client 210 broadcasts a DHCP Request message 224 accepting the chosen DHCP Offer, and in this broadcast message there may be included some parameters requesting further configuration data/parameters.

In response to the received DHCP Request that the DHCP Server who sent the associated DHCP Offer receives, the DHCP Server sends a DHCP Acknowledgement 226 (also known as a DHCP ACK), which may contain such information as lease duration and any other configuration data/information that the client may have requested. The DHCP Client, upon receiving the DHCP Acknowledge, configures the host (e.g. the UE) appropriately with the received parameters for the interface upon which the DHCP transaction took place.

Some basic DHCP options are defined by the IETF in IETF RFC 2132 [15], and further options are specified in further IETF specifications.

DHCP can be used in IPv4 networks and IPv6 networks, in which case DHCPv4 and DHCPv6 nomenclature is used. DHCPv6 has the following message names in place of those in FIG. 2 above:
  a) Solicit
  b) Advertise
  c) Request
  d) Reply WLAN ANQP (Access Network Query Protocol)

Figure 3:
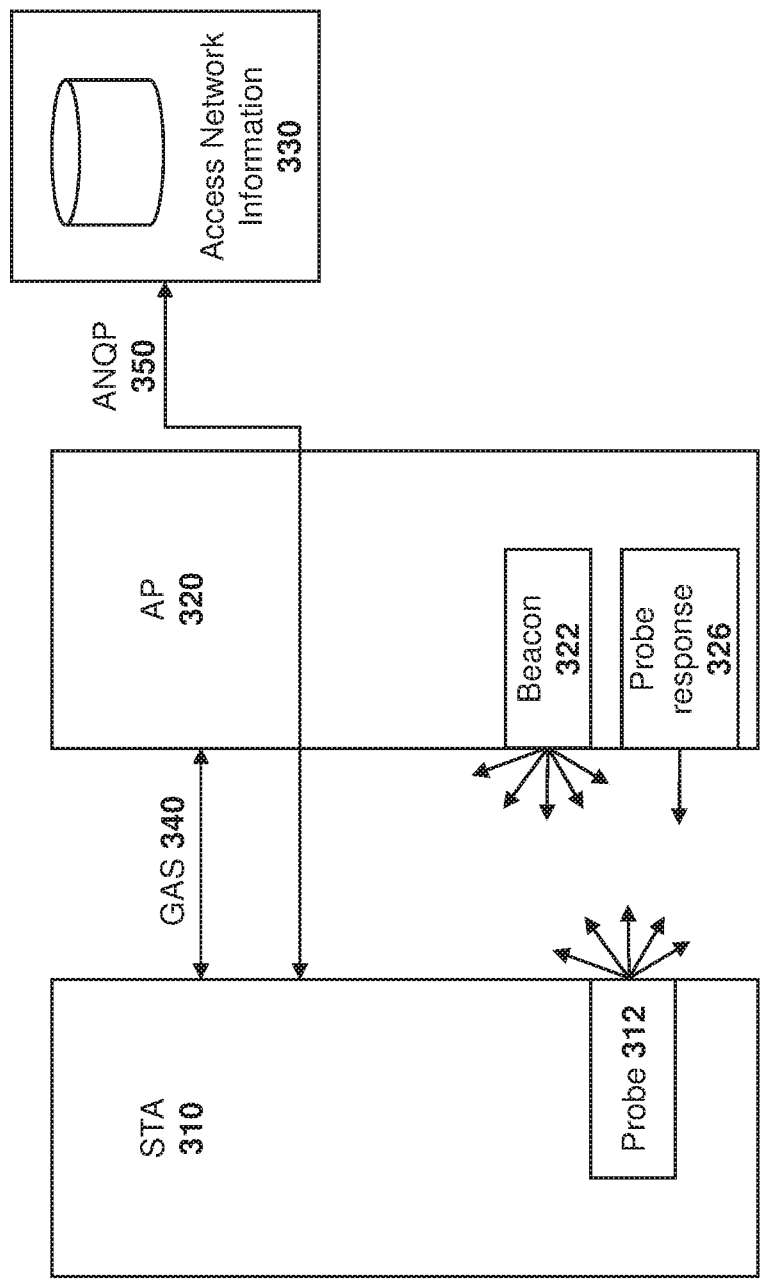
FIG. 3 is a block diagram showing WLAN access network query protocol.

An example architecture of the WLAN system is shown in FIG. 3. The IEEE 802.11 Access Network Query Protocol is one example of an advertisement protocol transported between mobile stations (STAs 310) and access points (APs 320). The STA is the equivalent of a UE.

In the embodiment of FIG. 3 A Generic Advertisement Service (GAS) 340 may be provided between STA 310 and AP 320. For example, STA 310 receives a beacon 322 from AP 320. Further STA 310 may send a probe 312 and listen for a probe response 326.

ANQP operates as a simple query and response protocol that is used by a mobile device to discover a range of information 330 from an "Access Network" (AN) server. This AN server is either co-located with an AP or is located within the Local Area Network (LAN), which is the layer 2 network to which the AP is connected.

ANQP 350 allows a mobile device (e.g. STA, UE) to determine the properties of the LAN before starting or at any time after the association procedure.

Information obtained through ANQP 350 can include: network identifiers, roaming relationships, supported security methods (IEEE 802.1X and web-based authentication), available service providers, among other options. This enables ANQP to be a very powerful protocol capable of discovering information about WLANs, e.g. prior to the mobile device establishing network connectivity.

Currently there are more than 20 individual ANQP-elements defined in IEEE 802.11 and various Wi-Fi Alliance programs (e.g. Hotspot 2.0), each one capable of retrieving different information (reports) from the LAN, for example:
  a) AP Location
  b) AP Venue Name
  c) Service Provider availability To discover each ANQP-element, the UE (STA) sends an ANQP Request to the AN server via an AP with an integer identifier (Info ID) corresponding to the desired information report. The AN server AP then responds, via the AP, with an ANQP-element containing that information report. The AN server may also discover the required information from either the WLAN or an external network to which it is attached.

5G Network

Figure 4:
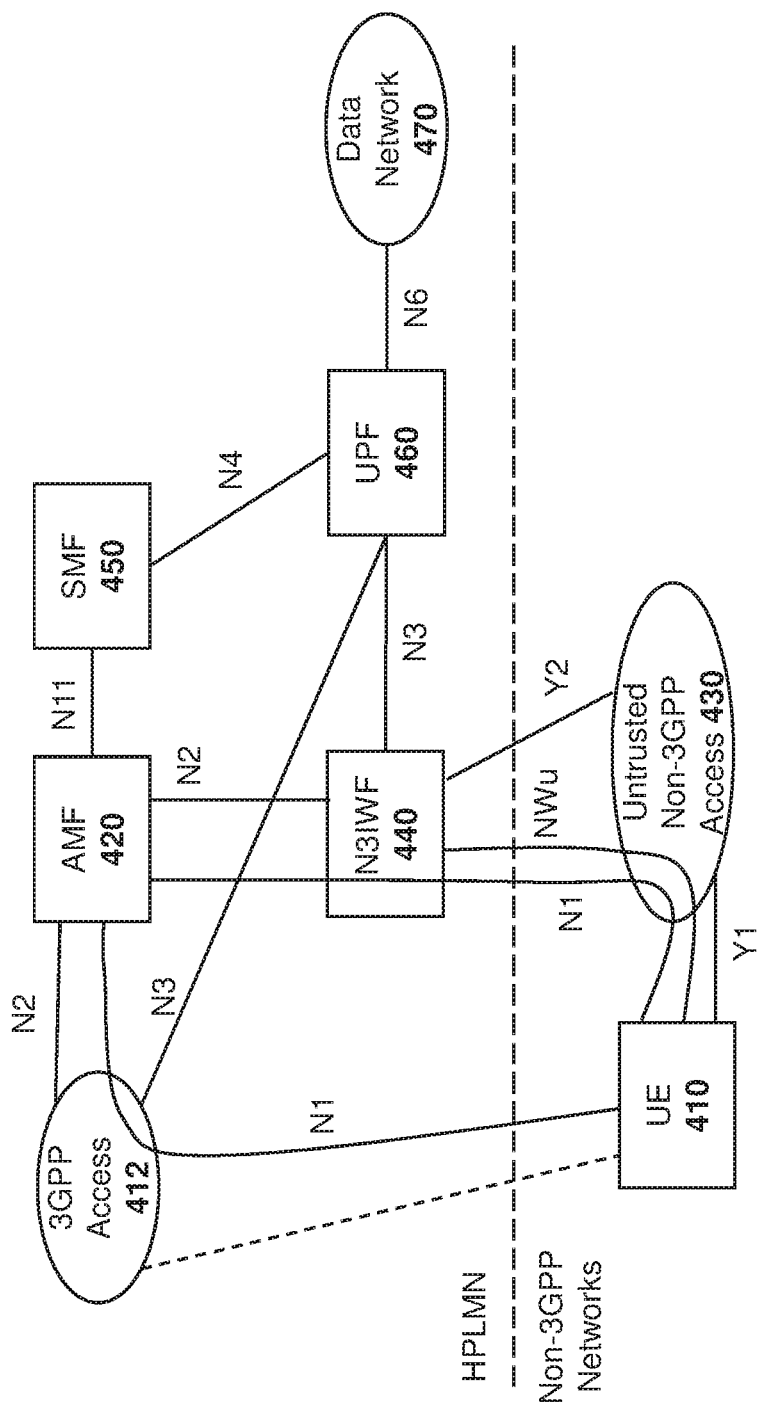
FIG. 4 is a block diagram of a non-roaming architecture for 5G core network with non-3GPP access.

FIG. 4 shows a non-roaming architecture for a 5G core network with non-3GPP access.

Within the 5G deployed network, various functions are provided in the 3GPP TS 23.501, "System Architecture for the 5G System", as for example provided in v. 0.3.0, February 2017. Example functions are provided in Table 2 below. The functions of Table 2 are virtualized; hence an operator may have many different "network slices" deployed. Network slices, to be further known as "slices" can perform different functions e.g. support voice based services, IoT services etc. PLMNa may deployed slices A and B while PLMN B may deploy slices A and C. Devices need to support multitude of capabilities or slices to be able to roam

TABLE 2

5G definitions from 3GPP TS 23.501

6 Network Functions
6.1 General
6.2 Network Function Functional description
6.2.1 AMF The Access and Mobility Management function (AMF) includes the following functionality. Some or all of the AMF functionalities may be supported in a single instance of a AMF:
Termination of RAN CP interface (N2).
Termination of NAS (N1), NAS ciphering and integrity protection.
Registration management.
Connection management.
Reachability management.
Mobility Management.
Lawful intercept (for AMF events and interface to LI System).
Transparent proxy for routing SM messages.
Access Authentication.
Access Authorization.
Security Anchor Function (SEAF). It interacts with the AUSF and the UE, receives the intermediate key that was established as a result of the UE authentication process. In case of USIM based authentication, the AMF retrieves the security material from the AUSF.

TABLE 2-continued 5G definitions from 3GPP TS 23.501

Security Context Management (SCM). The SCM receives a key from the SEAF that
it uses to derive access-network specific keys.
NOTE: Regardless of the number of Network functions, there is only one NAS
interface instance per access network between the UE and the CN,
terminated at one of the Network functions that implements at least NAS
security and mobility management.
In addition to the functionalities of the AMF described above, the AMF may include the
following functionality to support non-3GPP access networks:
Support of N2 interface with N3IWF. Over this interface, some information (e.g.
3GPP cell Identification) and procedures (e.g. Hand-Over related) defined over
3GPP access may not apply, and non-3GPP access specific information may be
applied that do not apply to 3GPP accesses.
Support of NAS signalling with a UE over N3IWF. Some procedures supported by
NAS signalling over 3GPP access may be not applicable to untrusted non-3GPP
(e.g. Paging) access.
Support of authentication of UEs connected over N3IWF.
Management of mobility and authentication/security context state(s) of a UE
connected via non-3GPP access or connected via 3GPP and non-3GPP accesses
simultaneously.
Support as described in clause 5.3.2.3 a co-ordinated RM management context
valid over 3GPP and Non 3GPP accesses.
Support as described in clause 5.3.3.4 dedicated CM management contexts for the
UE for connectivity over non-3GPP access.
NOTE: Not all of the functionalities are required to be supported in an instance of a
network slice.
6.2.2 SMF The Session Management function (SMF) includes the following functionality. Some or
all of the SMF functionalities may be supported in a single instance of a SMF:
Session Management e.g. Session establishment, modify and release, including
tunnel maintain between UPF and AN node.
UE IP address allocation & management (incl optional Authorization).
Selection and control of UP function.
Configures traffic steering at UPF to route traffic to proper destination.
Termination of interfaces towards Policy control functions.
Control part of policy enforcement and QoS.
Lawful intercept (for SM events and interface to LI System).
Termination of SM parts of NAS messages.
Downlink Data Notification.
Initiator of AN specific SM information, sent via AMF over N2 to AN.
Determine SSC mode of a session (for IP type PDU session).
Roaming functionality:
Handle local enforcement to apply QoS SLAs (VPLMN).
Charging data collection and charging interface (VPLMN).
Lawful intercept (in VPLMN for SM events and interface to LI System).
Support for interaction with external DN for transport of signalling for PDU
session authorization/authentication by external DN.
NOTE: Not all of the functionalities are required to be supported in an instance of a
network slice.
6.2.3 UPF The User plane function (UPF) includes the following functionality. Some or all of the
UPF functionalities may be supported in a single instance of a UPF:
Anchor point for Intra-/Inter-RAT mobility (when applicable).
External PDU session point of interconnect to Data Network.
Packet routing & forwarding.
Packet inspection and User plane part of Policy rule enforcement.
Lawful intercept (UP collection).
Traffic usage reporting.
Uplink classifier to support routing traffic flows to a data network.
Branching point to support multi-homed PDU session.
QoS handling for user plane, e.g. packet filtering, gating, UL/DL rate enforcement
Uplink Traffic verification (SDF to QoS flow mapping).
Transport level packet marking in the uplink and downlink.
Downlink packet buffering and downlink data notification triggering.
NOTE: Not all of the UPF functionalities are required to be supported in an instance
of user plane function of a network slice.
. . .
6.2.7 UDM The Unified Data Management (UDM) supports the following functionality:
Supports Authentication Credential Repository and Processing Function (ARPF).
This function stores the long-term security credentials used in authentication for
AKA.
Stores Subscription information.
NOTE 1: UDR (User data repository) could be present within the UDM.
NOTE 2: The interaction between UDM and HSS is implementation specific.

TABLE 2-continued 5G definitions from 3GPP TS 23.501

6.2.8 AUSF

The AUSF supports the following functionality:
Supports Authentication Server Function (AUSF) as specified by SA WG3.

6.2.9 N3IWF

The functionality of N3IWF in case of untrusted non-3GPP access includes
the following:
Support of IPsec tunnel establishment with the UE: The N3IWF terminates the
IKEv2/IPsec protocols with the UE over NWu and relays over N2 the information
needed to authenticate the UE and authorize its access to the 5G core network.
Termination of N2 and N3 interfaces to 5G core network for control-plane and user-
plane respectively.
Relaying uplink and downlink control-plane NAS (N1) signalling between the UE
and AMF.
Handling of N2 signalling from SMF (relayed by AMF) related to PDU sessions and
QoS.
Establishment of IPsec Security Association (IPsec SA) to support PDU Session
traffic.
Relaying uplink and downlink user-plane packets between the UE and UPF. This
involves:
De-capsulation/Encapsulation of packets for IPSec and N3 tunnelling
Enforcing QoS corresponding to N3 packet marking, taking into account QoS
requirements associated to such marking received over N2
N3 user-plane packet marking in the uplink.
Local mobility anchor within untrusted non-3GPP access networks using MOBIKE.
Supporting AMF selection.

Thus, based on Table 2 above, a UE 410 may utilize 3GPP access 412 to access AMF 420. For example, UE 410 may use an N1 interface for such access.

The interface between 3GPP access 412 and AMF 420 may be an N2 interface.

Alternatively, UE 410 may communicate with AMF 420 through Untrusted Non-3GPP Access 430. The interface between UE 410 and AMF 420 is an N1 interface. Further, a Y1 interface may be used between UE 410 and Untrusted non-3GPP Access 430.

UE 410 may further communicate with N3IWF 440 through Untrusted Non-3GPP Access 430 using an NWu interface. As provided in 3GPP TS 23.510, the NWu is a used between the UE and N3IWF for establishing secure tunnels between the UE and N3IWF so that control-plane and user-plane traffic exchanged between the UE and the 5G Core Network is transferred securely over untrusted non-3GPP access.

AMF 420 and N3IWF 440 may communicate using an N2 interface.

AMF 420 may further communicate with SMF 450 using an N11 interface.

3GPP Access 412 and N3IWF 440 may communicate with a UPF 460 using an N3 interface. UPF 460 may then communicate with an external data network 470 using an N6 interface.

SMF 450 and UPF 460 may further communicate using an N4 interface.

Emergency Numbers Via WLAN and Policy Using NAS Indicator Via 3GPP AN (Access Network)

Example definitions from 3GPP TS 23.167, *"IP Multimedia Subsystem (IMS) emergency sessions"*, v.14.3.0, March 2017, are provided in Table 3 below.

TABLE 3 definitions from 3GPP TS 23.167

4.1 Architectural Principles

The solution for emergency sessions in the IMS fulfils the emergency principles and
requirements of TS 22.101, TS 22.228 and the following architectural requirements:
2a. Emergency numbers/types received via WLAN are only used for detecting
emergency calls in the same country, if permission from PLMN selected in 3GPP
access was received (see TS 23.401 and TS 23.060).

J.2 UE specific behaviour

Procedure for determining the list of emergency numbers:
In addition to the emergency numbers/types stored either on the USIM or on the user
equipment specified in TS 22.101 clause 10.1.1, the UE shall use the stored Local
Emergency Numbers List received from the 3GPP network to detect that the number
dialled is an emergency number.
If a UE has a SIM/USIM and has received a list of emergency numbers/types from
the last registered PLMN via mobility management procedures as described in
TS 24.301 and TS 24.008 when connected to the PLMN using UTRAN or E-UTRAN
radio access network, the UE shall use this list to determine if the dialled digits
correspond to an emergency call as long as the UE has determined that the list is
valid (i.e. UE has determined that it is in the same country when the list of emergency
numbers was received from PLMN).

TABLE 3-continued definitions from 3GPP TS 23.167

The UE may also determine that the dialled digits/types correspond to an emergency call based on the list of emergency numbers retrieved by one of the following means:
NOTE: How the UE uses two lists (a list of emergency numbers/types received via mobility management procedures and a list of emergency numbers retrieved via the WLAN) is a stage 3 decision.
a) via Access Network Query Protocol (ANQP) procedures defined in IEEE Std 802.11-2012 from the associated WLAN AP upon completing authentication with the trusted WLAN, with management frame protection enabled.
b) via a previous query to a DNS only when that DNS is in the same country as the UE and is an internal DNS server in the 3GPP network whose address is acquired from the ePDG; or
c) via IKEv2 procedures from ePDG.
The list of downloaded emergency numbers shall be deleted at country change.

Further, example definitions from 3GPP TS 23.060, "General Packet Radio Service (GPRS); Service description; Stage 2", v.14.3.0, March 2017, and 3GPP TS 23.402, "Architecture enhancements for non-3GPP accesses", v.14.3.0, March 2017, are provided in Table 4 below.

TABLE 4 definitions from 3GPP TS 23.060 and 23.402

For emergency services other than eCall, a UE determines from a NAS indicator that additional emergency numbers/types received via WLAN may be used for detecting emergency calls.

Emergency Numbers Via 3GPP AN (Access Network)

When connected to a PLMN using GERAN, UTRAN or E-UTRAN radio access network a list of emergency numbers/types can be received at the UE during mobility management procedures as described in TS 24.301 and TS 24.008. Mobility management procedures in these accesses include attach procedures, location area update procedures, tracking area update procedures, routing area update procedures. During these procedures a list of emergency numbers/types for the PLMN the UE is performing the procedures with, can be received.

For the above aspects and predicates, UEs need to know emergency numbers and types or categories (e.g. fire, ambulance, police, mountain rescue etc.) for which "UE detected emergency calls are" supported by a PLMN via a Trusted WLAN or untrusted WLAN. In the same country, different PLMNs may support different "UE detected emergency calls".

For example, PLMN A configures the UE attaching to its network to detect dial digits (e.g. 110) as an emergency call. This UE, when detecting dialled digits 110, will perform "UE detected emergency call" procedures. The EMERGENCY SETUP (in case of selecting the CS (circuit switched) domain) will not include the dialled digits, rather it will include a derived category encoded in 5 bits. E.g. category "fire".

PLMN B (in the same country) has not configured its network to route calls categorized as fire to a PSAP capable of handling fire-related emergencies. PLMN B's network relies on receiving the dialled digits to do so. PLMN B will therefore not configure UEs attached to its network to detect 110 as an emergency number.

A UE connected to different PLMNs via 3GPP access and WLAN access may be configured by both PLMN's with emergency call numbers. When the UE has been configured with PLMN A's emergency numbers and types or categories via WLAN, and the UE uses these to initiate a "UE detected emergency call" via e.g. 3GPP access where the serving network is PLMN B, then PLMN B may receive a "UE detected emergency call" for a type/category for which it hasn't configured its network. Instead, PLMN B would have expected to receive a normal call (a normal call is a non-emergency call. The message initiating the call includes the dialled digits). The normal call would include dialed digits. The network would then parse the dialed digits and possibly route the call to the correct PSAP based on the dialed digits.

Therefore, in accordance with the embodiments of the present disclosure, emergency numbers may be configured in various ways.

WLAN ANQP

Figure 5:
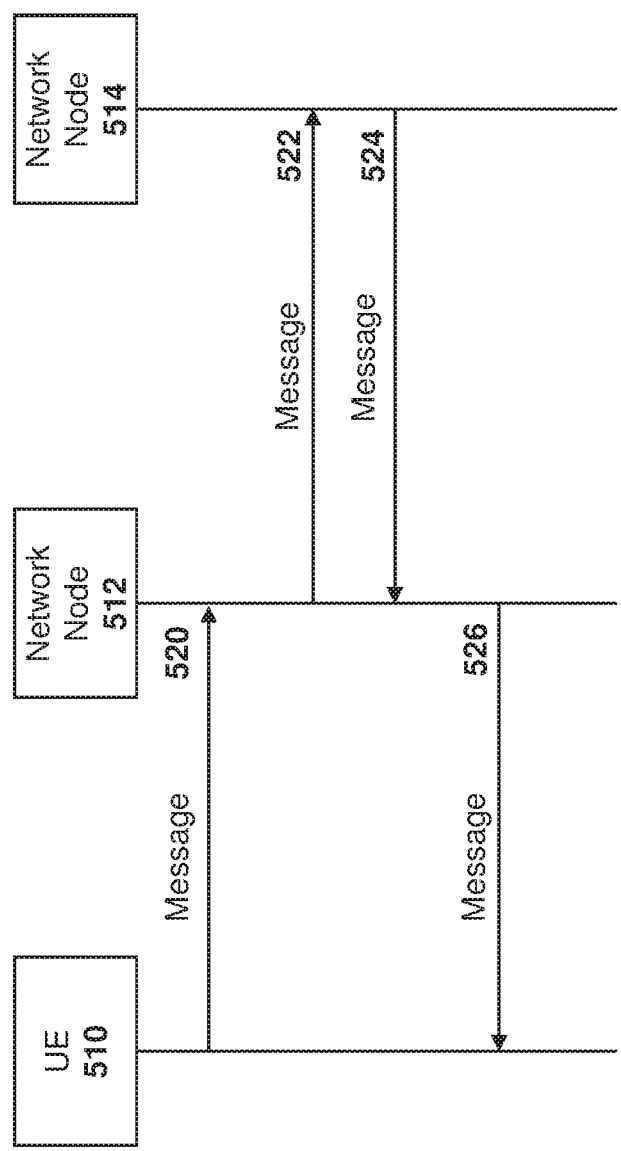
FIG. 5 is a data flow diagram showing a general procedure for receipt of short codes in accordance with one embodiment.

In accordance with one embodiment, at least one list of emergency numbers and their types or categories may be included in the ANQP response; e.g. one for each PLMN or service provider. Reference is now made to FIG. 5, which shows a general procedure for receipt of emergency information.

In FIG. 5, A UE 510 may communicate with a network node 512, which may communicate with a network node 514. Network node 512 may, for example, be an access point. Network node 514 may, for example, be an advertisement server for ANQP.

In the embodiment of FIG. 5, UE 510 sends a message 520 to Network Node 512 and Network Node 512 receives the message 520. Message 520 may be an ANQP request and may contain Additional UE Provided Information.

In the embodiment of FIG. 5, the Credit Control (CC)-request and CC-answer may be DIAMETER or (equivalent) RADIUS messages. They could also be messages part of another protocol.

Upon receiving Message 520, Network Node 512 may send Message 522 to Network Node 514. Message 522 may contain Additional UE Provided Information e.g. if received in Message 520. In one embodiment message 522 may be a CC-Request.

In some embodiments, the functionality of Network Node 514 may be co-located with Network Node 512, so that Message 522 and Message 524 become internal messages within Network Node 512.

In the embodiment of FIG. 5, upon receiving Message 522, Network Node 514 sends Message 524 to Network Node 512. Message 524 may contain one or both of Routing Data and/or an error message. In one embodiment message 524 may be a CC-Answer.

Upon receiving Message 524, Network Node 512 sends Message 526 to UE 510. Message 526 may contain one or both of Routing Data and/or an error message, for example depending on what was received in Message 524. Message 526 may be considered an ANQP response in one embodiment.

Thus, in accordance with the above, UE 510:

sends a ANQP request message indication; at least one of "Emergency Call Number" ANQP-element or "3GPP Cellular Network" ANQP-element receives an ANQP response message indication; at least one of "Emergency Call Number" ANQP-element or "3GPP Cellular Network" ANQP-element, the ANQP response message further including at least one list of emergency numbers, the list of emergency numbers being associated with at least one of a service provider identifier or a country code.

Further, in accordance with the above, Network Node 512:

receives a ANQP request message indication; including at least one of "Emergency Call Number" ANQP-element or "3GPP Cellular Network" ANQP-element sends an ANQP response message indication; including at least one of "Emergency Call Number" ANQP-element or "3GPP Cellular Network" ANQP-element, the ANQP response message further including at least one list of emergency numbers, the list of emergency numbers being associated with at least one of a service provider identifier or a country code.

Further, UE 510 or network node 512, may additionally provide or be provided other information.

Optionally, the ANQP response message indicates one or more emergency categories or types per emergency number.

Optionally, the service provider identifier comprises a PLMN code

Optionally, the service provider identifier comprises a NAI realm

Optionally, the NAI realm comprises a PLMN code

Optionally, the PLMN code comprises a MCC and a MNC

Optionally, the country identifier comprises one or more MCC codes, or one or more IEEE 802.11d country codes or one or more two letter country codes or one or more 3 letter country codes.

In general, the "Emergency Call Number" ANQP-element enables an AP or ANQP server to respond with, for example, UTF-8 strings of characters. To include PLMN specific lists of emergency numbers, types/categories in this string, the string would indicate the PLMN to which this list applies. A high-level example encoding is provided in Table 5 below:

TABLE 5

Example Encoding of Emergency Call Number

[One or more <MNC,MCC>:[one or more <emergency digits>, [one or more <emergency type>]>]]

In some embodiments, optimizations of data may be provided. For example, the data to be provided via ANQP could be reduced in some cases. For example, where all PLMNs in the same country (i.e. share one or more MCCs) support the same "UE detectable emergency calls", the example encoding could be as follows in Table 6.

TABLE 6

Example Optimized Encoding of Emergency Call Number

[One or more <MCCs>:[one or more <emergency digits>,[one or more <emergency type>]>]]

In some cases, some countries have reserved more than one mobile country code (MCC). Further, in some cases a mixture of the encoding of Tables 5 and 6 above could be used.

ABNF

In a further embodiment Augmented Backus-Naur form may be used.

In general, the Emergency Call Number field is a variable-length UTF-8 (see RFC 3629) formatted field. The purpose of this field is to encode emergency number(s) (and type(s) of category(ies)) for use within the country where the field is received, for example per PLMN. This subclause describes the formatting of the Emergency Call Number field used in the Emergency Call Number ANQP-element specified in IEEE 802.11-2016.

The formatting, in general is described as follows. For the purposes of aiding the detection of an emergency call number and assigning the emergency type, the Emergency Call Number field can contain zero or more mobile network codes (MNC) codes, one or more MCC codes, an emergency call number and zero or more emergency call types (or categories). The emergency call number and zero or more emergency call types are encoded as namespace specific strings for the namespace identifier equal to 3gpp (see IETF RFC 5279). This specification further defines a namespace identifier, e.g. a namespace identifier equal to sos-anqp and parameters.

With regards to ABNF for the Uniform Resource Name (URN) urn:3gpp:sos-anqp namespace and its parameters, Table 7 below contains the ABNF (IETF RFC 2234) for the urn:3gpp:sos-anqp namespace and its parameters. For example the URN "urn:3gpp:sos-anqp:mcc404:mcc405: 101:sos.fire" can be expressed using the conventions coded in Table 7.

TABLE 7

Syntax of urn:3gpp:sos-anqp emergency-information = "urn:3gpp:sos-anqp:" mcc (":"mnc ) *(":" mcc (":"mnc ))
*(":" emergency-number *(":" label ))
emergency-information =/ "urn:3gpp:sos-anqp:noLocalEmergencyNumbers"
emergency-information =/ "urn:3gpp:sos-anqp:keepLocalEmergencyNumbers"
emergency-information =/ "urn:3gpp:sos-anqp"
emergency-number    = DIGIT*DIGIT            ; at least one DIGIT
mcc                 = DIGIT DIGIT (DIGIT)    ; exactly 2 or 3 digits
mnc                 = DIGIT DIGIT (DIGIT)    ; exactly 2 or 3 digits
label               = "sos" *("." sub-label)
sub-label           = let-dig [ *let-dig-hyp let-dig ]

TABLE 7-continued

Syntax of urn:3gpp:sos-anqp

| | | |
|---|---|---|
| let-dig-hyp | = let-dig /"-" | |
| let-dig | = ALPHA / DIGIT | |
| ALPHA | = %x41-5A / %x61-7A | ; A-Z / a-z |
| DIGIT | = %x30-%x39; | ; 0-9 |

While the syntax of Table 7 allows for many different sub-labels following "sos", when originating an emergency IMS session (see TS 24.229) based on detecting a match with dialed digits, the SIP INVITE may only contain one of the following service URNs "urn:service:sos", "urn:service:sos.ambulance", "urn:service:sos.police", "urn:service:sos.fire", "urn:service:sos.marine", "urn:service:sos.mountain"

Table 7 uses a URN namespace, e.g. "urn:3gpp:sos-anqp:" to identify the 3GPP encoding. Other SDOs can use their own encoding.

A 3GPP UE can receive a list with emergency numbers or an empty list. An empty list is e.g. indicated as "urn:3gpp:sos-anqp" or "urn:3gpp:sos-anqp:noLocalEmerdencyNumbers" or "urn:3gpp:sos-anqp:mccXX(X)". The empty list causes a UE to overwrite a previously received list with local emergency numbers with an empty list. The XX(X) (in the previous sentence's example "urn:3gpp:sos-anqp:mccXX(X)") indicates the 2 (or 3) digits of the MCC.

When the UE receives "keepLocalEmergencyNumbers" included within this ANQP-element field, or when the ANQP-element field does not include a URN that starts with "urn:3gpp:sos-anqb" or when the UE does not recognize the encoding (e.g. because the ABNF parser fails to parse the string) or when the UE doesn't receive the ANQP-element field, the UE may keep the numbers it had, in case the UE has previously received list(s) with local emergency numbers.

When a 3GPP UE receives a list with emergency numbers, e.g. urn:3gpp:sos-anqp:mcc404:mcc405:101:sos.fire, the UE knows that in the country identified by two MCCs (i.e. codes 404 or 405 represent India) the number that summons the fire department to an emergency is "101". On the other hand, for example urn:3gpp:sos-anqp:mccABC:mncXYZ:18:sos.fire:sos.ambulance indicates that the operator XYZ in country ABC has configured its network to recognize emergency calls typed fire or categorized fire and ambulance. In this network, the UE can detect dialled digits 18 as an emergency number. The UE can then initiate emergency call procedures as opposed to normal (non-emergency) call procedures.

3GPP Cellular Network ANQP-Element

In a further embodiment, the "3GPP Cellular Network" ANQP-element enables an AP or ANQP server to respond with an information element defined by 3GPP in TS 24.302.

TS 24.302 describes the structure and contents of the generic container used as the payload in the 3GPP Cellular Network ANQP-element specified in IEEE 802.11-2016.

The generic container for the ANQP payload can convey a PLMN List or a PLMN List with S2a connectivity. The PLMN List information element is used by the network to indicate the PLMNs that can be selected from the WLAN. The PLMN List with S2a connectivity information element is used by the WLAN to indicate the PLMNs to which the WLAN provides S2a connectivity.

The "3GPP Cellular Network" ANQP-element can be enhanced to convey per PLMN emergency number/type lists or per MCC emergency number/type lists.

For example, Table 8 which is represented by FIGS. 10A-10E, that flow from one to the next, represents changes to the definition of the generic container within 3GPP TS 24.302, Annex H, as shown in bold and underline in the table.

TABLE 8

Changes to 3GPP TS 24.302 shown in bold and underlining

When the UE receives a 3GPP Cellular Network ANQP Element with content length set to 0 or 3GPP Cellular Network ANQP-element without the IEI field set to "00000002" or "Emergency numbers list" (see H.2.4.1), then the UE may keep the numbers it had, in case the UE has previously received a list with local emergency numbers.
In the embodiments described herein, the "Emergency numbers list" may also be known as "Additional emergency numbers list".
EmergencyNumberList ANQP-element
In a further embodiment, an alternative is to enhance for example the Wi-Fi Alliance Hotspot 2.0 specifications or IEEE 802.11-2016 for encoding and providing the information. Similar encoding can be used to enhance the IEEE 802.11-2016 specification.
In this alternative, a new ANQP-element is defined. The new ANQP-element encodes the information is a binary version, without further overloading the 3GPP Cellular Network ANQP Element.

Referring to Table 9, which is represented by FIGS. 11A-11D, that flow from one to the next, below, the following bold and underlined text represents example changes to the Wi-Fi Alliance Hotspot 2.0 (Release 2) Technical Specification Version 1.2.5

TABLE 9

Changes to Wi-Fi Alliance Hotspot 2.0 shown in bold and underlining

EAP PROCEDURE

Figure 6:
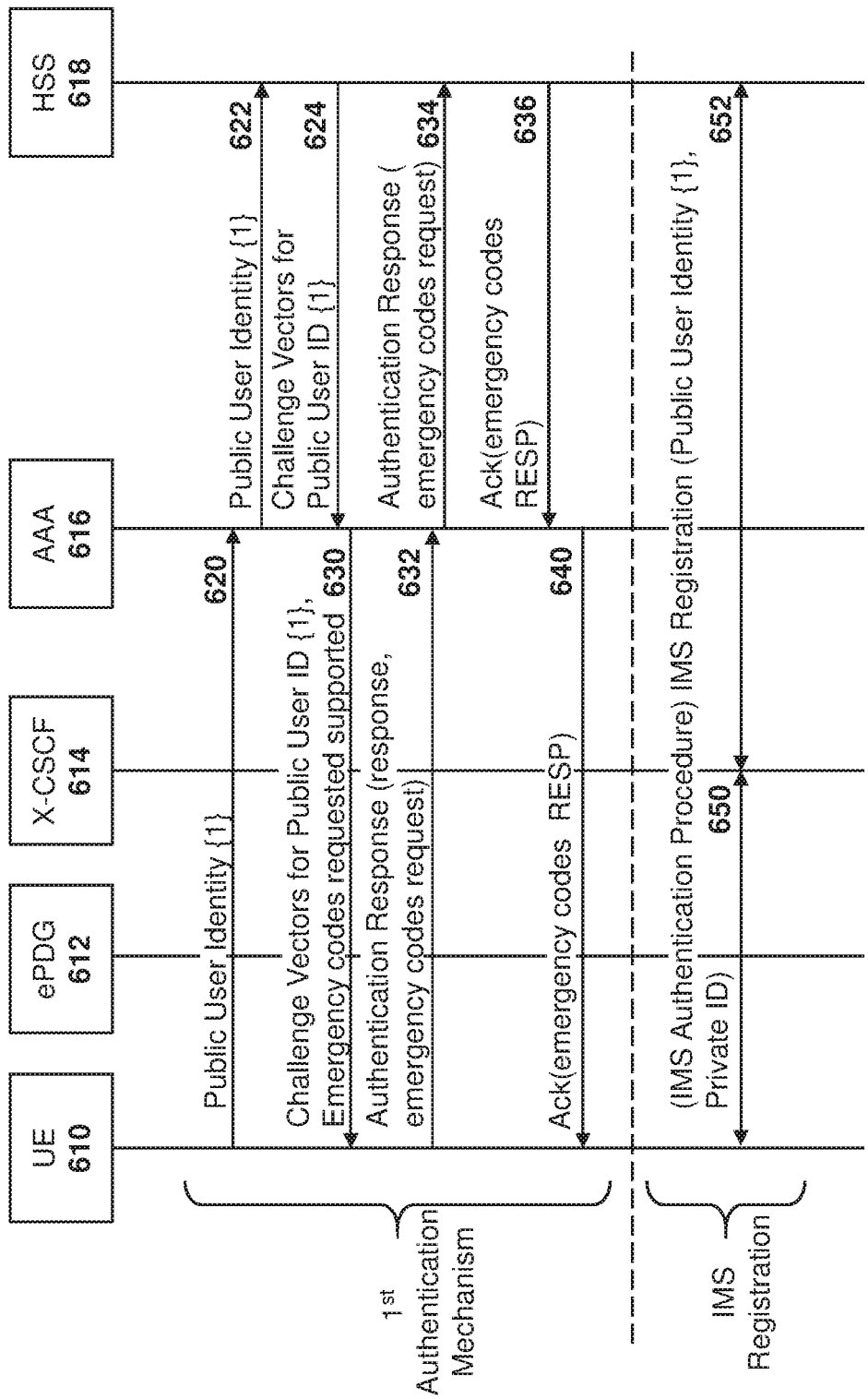
FIG. 6 is a data flow diagram showing EAP signalling for short code configuration.

In a further embodiment, an EAP procedure is provided. In accordance with the embodiment of FIG. 6 described below, a UE 610:
sends an authentication message 620 to the AAA server 616 containing either one to many identities.
Receives an authentication message 630 from the AAA server 616 containing a parameter "EmergencyNumberList selection indicator supported"
This parameter indicates that the AAA server 616 can send "EmergencyNumberList"
Sends an authentication response message 632 to the AAA server 616 containing a request for an EmergencyNumberList.
Receives an authentication message 640 from the AAA server 616 containing the "EmergencyNumberList".
Further, a AAA 616:
Receives a message 620 from the UE 610 with at least one identity
Sends a message 630 to the UE 610 containing a parameter "EmergencyNumberList supported"
This parameter indicates that the AAA server can send "EmergencyNumberList" in a later authentication message.
receives an authentication message 632 containing an indication that an EmergencyNumberList is required
Sends an authentication message 640 to the UE 610 containing a parameter "EmergencyNumberList".
In addition to the messages described above, AAA 616, on receiving message 620 provides the Public User Identity to HSS 618 in message 622. AAA 616 then receives Challenge Vectors from HSS 618 in message 624. These Challenge Vectors are then used as part of message 630.
Further, on receiving message 632, AAA 616 then sends an authentication response 634 to HSS 618 and receives an acknowledgement 636 back from HSS 618. This acknowledgement is then used for message 640.
The above provides for a first authentication mechanism. Subsequently, an IMS registration may occur, as for example as shown by arrow 650 between UE 610 and X-CSCF 614, and by arrow 652 between X-CSCF 614 and HSS 618 in the embodiment of FIG. 6. As used in the present disclosure, "X-CSCF" represents the P-CSCF or the Serving-Call Session Control Function (S-CSCF).
The changes to support FIG. 6 are described below. In particular, FIG. 6 is described by the text and tables below which are potential modifications to 3GPP TS 24.302. However, the embodiment of FIG. 6 provide logical functions that may be combined together. For example, ePDG 612 has an AAA function in it to terminate or proxy EAP messages.

Referring to Table 10 which is represented by FIGS. 12A-12H below, that flow from one to the next, the text in bold and underline shows one example potential modification to a specification, section numbers and references are those in that specification.

TABLE 10

Proposed changes to 3GPP TS 24.302

As an alternative, instead of using ATEmergencyNumberListREQUEST an Internet Key Exchange Protocol Version 2 (IKEv2) CFG_REQUEST may be used to request the EmergencyNumberList.
As an alternative, instead of using ATEmergencyNumberListRESP attribute, a CFG_REPLY may be used that contains the EmergencyNumberList.
DHCP

In a further embodiment, DHCP may enhanced so that an "EmergencyNumberList" can be returned to the UE when the UE performs DHCP negotiation after attaching to the WLAN and attempt to negotiate with a DHCP server to gain certain information. For example, the information may be IP layer information such as IP address to use, DNS server IP addresses, among other options.
A UE may utilise DHCP to discover the details of one or more EmergencyNumberList(s). A UE may perform such a DHCP operation/transaction regardless of whether DHCP is being used to also obtain an IP address e.g. consider the case where a UE learns an IP address via a PCO, or the case where a UE learns an IP address through stateless address autoconfiguration.

TABLE 10-continued

| Proposed changes to 3GPP TS 24.302 |
|---|
| DHCP may convey one or a combination of the following different types of parameters relating to the EmergencyNumberList:<br>Indication of one of the following:<br>A UE must attempt to use only an EmergencyNumberList in the RPLMN of the WLAN<br>A UE must attempt to use only an EmergencyNumberList in the RPLMN of the 3GPP access |

A UE may, but need not, indicate its ability/intention/capability/support of an EmergencyNumberList in the RPLMN of the WLAN connection/selection in order to receive an EmergencyNumberList in the RPLMN of the WLAN related options/parameters from a DHCP server.

In the example of Table 11 which is represented by FIGS. 13A, 13B and 13C, that flow from one to the next, below, DHCPv4 and DHCPv6 options are defined for conveying ePDG IPv4 and IPv6 addresses, where XXX and YYY indicate reserved numerical values that each uniquely identify the new DHCP option. Similar encoding could be assumed for any of the above listed parameters relating to EmergencyNumberList.

TABLE 11

| Proposed modifications to RFC 2132 |
|---|
| 5G |
| In a further embodiment, a 5G solution is provided. In this embodiment, functionality includes:<br>Mobile device creates a secure tunnel with the non 3GPP network<br>Mobile Device receives NAS message from the non 3GPP network containing a list of emergency numbers specific to the network the Mobile device has registered with.<br>Additionally, optional functionality includes<br>The emergency numbers can be further related to the network slice (e.g. SST and optional SD) the Mobile Device has registered with. |

Changes are shown below in Table 12, which is represented by FIGS. 14A and 14B that flow from one to the next, in bold and underlining that adds text to 3GPP TS 23.501. The changes in Table 12 correspond to FIG. 7:

TABLE 12

Figure 7:
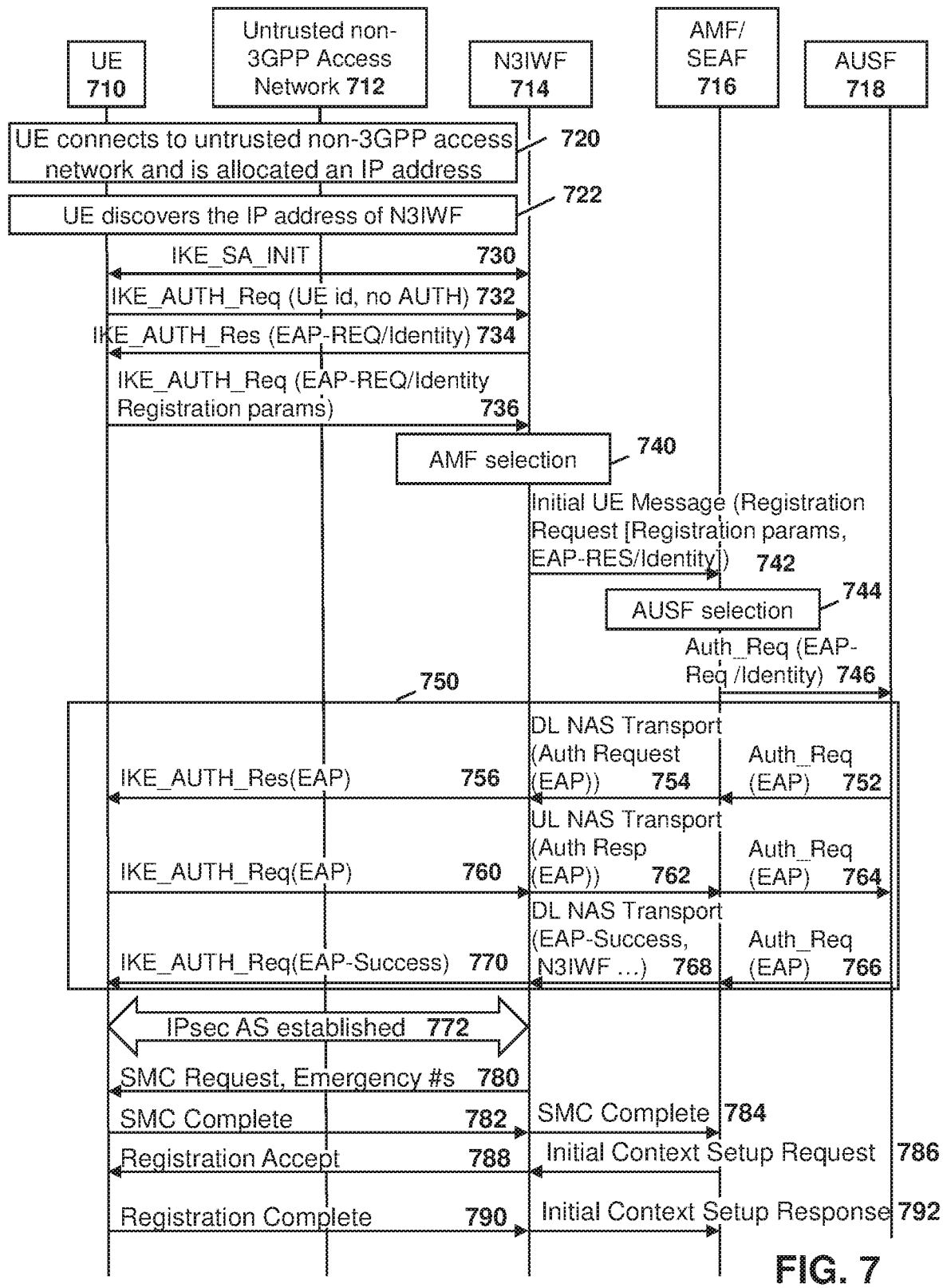
FIG. 7 is a data flow diagram showing initial registration via an untrusted non-3GPP access.

| proposed in bold (item 7) changes that adds text to 3GPP TS 23.501 |
|---|
| In Table 12 above, in step 7 X could be any of the codings as described in the present disclosure.<br>Specifically, according to FIG. 7 a UE 710 communicates through a Untrusted non-3GPP Access Network 712.<br>Further, 5G elements include N3IWF 714, AMF/SEAF 716 and AUSF 718.<br>As seen in block 720, the UE 710 connects to an Untrusted non-3GPP Access Network 712 and is allocated an IP address.<br>Further, as seen in block 722, the UE 710 discovers the IP address of N3IWF 714.<br>After discovering the IP address, UE 710 and N3IWF 714 exchange IKE_SA_INIT messages 730. Specifically, IKE_AUTH Req 732 is sent from UE 710 to N3IWF 714, and may contain a user equipment identifier and a "no AUTH" indication.<br>In response N3IWF 714 sends a message 734 which may contain an EAP-REQ/Identity.<br>The UE 710 responds to message 734 with an IKE_AUTH Request 736 which contains EAP-Response/Identity along with registration parameters.<br>Based on request 736, N3IWF 714 performs an AMF selection, as shown by block 740. The N3IWF 714 may then send an initial UE message 742. Message 742 may contain a registration request, registration parameters and EAP-Response/Identity.<br>On receipt of message 742 AMF/SEAF 716 may perform an AUSF selection as shown by block 744.<br>Once AUSF 718 is selected, AMF/SEAF 716 sends an authentication request 746 to AUSF 718. |

TABLE 12-continued proposed in bold (item 7) changes that adds text to 3GPP TS 23.501

AUSF 718 may then perform mutual EAP-based authentication with UE 710, as shown by block 750. In particular, AUSF 718 sends an authentication response 752 to AMF/SEAF 716. The AMF/SEAF 716 then sends a DL NAS Transport message 754 containing message 752 to N3IWF 714.
N3IWF 714 then sends an IKE_AUTH Response 756 with the EAP to UE 710.
UE 710 then provides an IKE_AUTH Request 760 with the EAP back to N3IWF 714.
N3IWF 714 then provides an UL NAS Transport with an authentication response in message 762 back to AMF/SEAF 716. An authentication request is then provided back to AUSF 718 as shown by message 764. AUSF 718 verifies the request and provides an authentication response 766 indicating EAP-Success along with security keys to AMF/SEAF 716.
AMF/SEAF 716 then provides DL NAS Transport in message 768 to N3IWF 714.
Message 768 contains the EAP-Success indicator, the N3IWF security key and an SMC Request.
N3IWF 714 then provides an IKE_AUTH Response 770 back to UE 710.
Subsequently, the IPsec SA is established, as shown by arrow 772.
N3IWF 714 can then send an NAS over IPsec message providing an SMC Request 780. Message 780 may optionally provide a list of emergency numbers as indicated in Table 12 above.
In response to message 780, UE 710 provides an SMC Complete message 782 back to N3IWF 714. The N3IWF 714 may then provide an SMC Complete message 784 to AMF/SEAF 716, for example using an uplink NAS Transport.
AMF/SEAF 716 may then perform an initial context set up request in message 786, indicating Registration Accept. Message 786 is provided to N3IWF 714.
On receipt of message 786, N3IWF 714 provides a Registration Accept Message 788 to UE 710. UE 710 may then provide a Registration Complete 790 back to N3IWF 714.
N3IWF 714 then provides an Initial Context Setup Response Message 792 back to the AMF/SEAF 716, indicating Registration Complete.

PCO

In a further embodiment, a Mobile Device sends a message optionally containing an indication that it requires "emergencynumberlist". The Mobile Device receives a message back containing "emergencynumberlist", wherein the emergencynumberlist comes back in an EAP response, and wherein the emergencynumberlist is in a Protocol Configuration Option.

PCO information, as described above, can be contained within EAP messages. This solution describes how an emergencynumberlist can be coded using PCO in an EAP response message to the UE. Equally the PCO could be encoded in an ANQP response.

Table 13, which is represented by FIG. 15 below, shows an example implementation in which proposed modifications are indicated by the underlined text:

TABLE 13

Proposed modifications to 3GPP TS 24.008

Possible encodings of emergencynumberlist are described above.
The network elements and mobile devices described above may be any computing device. Such computing device or network node may include any type of electronic device, including but not limited to, mobile devices such as smartphones or cellular telephones. Examples can further include fixed or mobile devices, such as internet of things devices, endpoints, home automation devices, medical equipment in hospital or home environments, inventory tracking devices, environmental monitoring devices, energy management devices, infrastructure management devices, vehicles or devices for vehicles, fixed electronic devices, among others.

Figure 8:
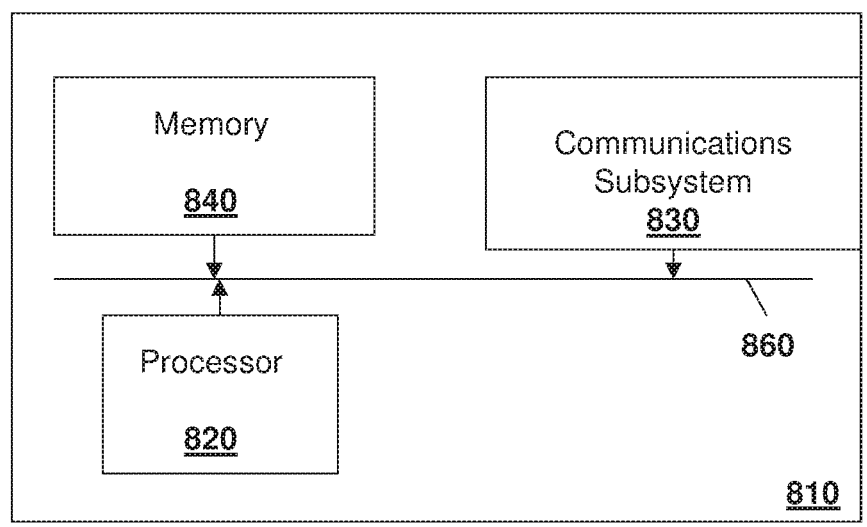
FIG. 8 is a block diagram of a simplified electronic device capable of being used with the methods and systems herein according to one embodiment.

One simplified block diagram of a computing device is shown with regard to FIG. 8.

In FIG. 8, device 810 includes a processor 820 and a communications subsystem 830, where the processor 820 and communications subsystem 830 cooperate to perform the methods of the embodiments described above.

Processor 820 is configured to execute programmable logic, which may be stored, along with data, on device 810, and shown in the example of FIG. 8 as memory 840. Memory 840 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, solid state drive, or other memory known in the art.

Alternatively, or in addition to memory 840, device 810 may access data or programmable logic from an external storage medium, for example through communications subsystem 830.

Communications subsystem 830 allows device 810 to communicate with other devices or network elements.

Communications between the various elements of device 810 may be through an internal bus 860 in one embodiment. However, other forms of communication are possible and are within the scope of the present disclosure.

Further, one example mobile device is described below with regard to FIG. 9.

Mobile device 900 may comprise a two-way wireless communication device having voice and data communication capabilities. Mobile device 900 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a user equipment, a smartphone, a tablet, a laptop, a notebook, or a data communication device, as non-limiting examples.

Where mobile device 900 is enabled for two-way communication, it may incorporate a communication subsystem 911, including a receiver 912 and a transmitter 914, as well as associated components such as one or more antenna elements 916 and 918, local oscillators (LOs) 913, and a processing module such as a digital signal processor (DSP) 920. As will be apparent to those skilled in the field of communications, the particular design of the communication subsystem 911 will be dependent upon the communication network in which the device is intended to operate.

Network access requirements will also vary depending upon the type of network 919. In some networks network access is associated with a subscriber or user of mobile device 900. A mobile device may require a removable user identity module (RUIM) or a subscriber identity module (SIM) card in order to operate on a network. The SIM/RUIM interface 944 is normally similar to a card-slot into which a SIM/RUIM card can be inserted and ejected. The SIM/RUIM card can have memory and hold many key configurations 951, and other information 953 such as identification, and subscriber related information. Without a SIM card, the mobile device may still be capable of limited functionality, including placing an emergency call.

When required network registration or activation procedures have been completed, mobile device 900 may send and receive communication signals over the network 919. As illustrated in FIG. 9, network 919 can include multiple base stations communicating with the mobile device.

Signals received by antenna 916 through communication network 919 are input to receiver 912, which may perform such common receiver functions as signal amplification, frequency down conversion, filtering, channel selection and the like. Analog to digital (A/D) conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog (D/A) conversion, frequency up conversion, filtering, amplification and transmission over the communication network 919 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

Mobile device 900 generally includes a processor 938 which controls the overall operation of the device. Communication functions, including data and optionally voice communications, are performed through communication subsystem 911. Processor 938 also interacts with further device subsystems such as the display 922, flash memory 924, random access memory (RAM) 926, auxiliary input/output (I/O) subsystems 928, serial port 930, one or more keyboards or keypads 932, speaker 934, microphone 936, other communication subsystem 940 such as a short-range communications subsystem and any other device subsystems, such as sensors, generally designated as 942. Serial port 930 may include a USB port or other port known to those in the art.

Figure 9:
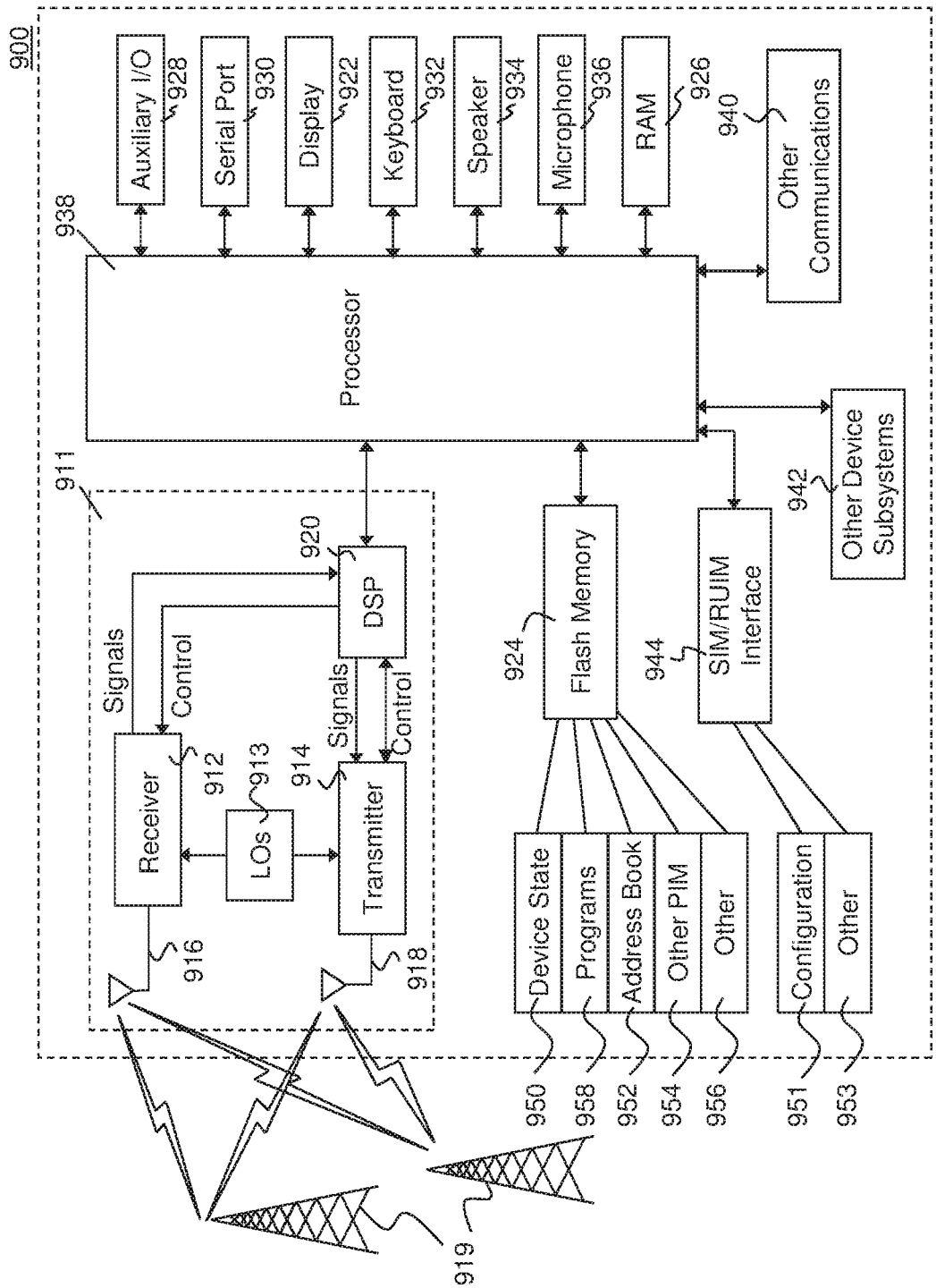
FIG. 9 is a block diagram of a mobile device according to one embodiment.

Some of the subsystems shown in FIG. 9 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the processor 938 may be stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. On such program data storage may include a credential vault.

Processor 938, in addition to its operating system functions, may enable execution of software applications on the mobile device. A predetermined set of applications that control basic operations, including at least data and voice communication applications for example, will normally be installed on mobile device 900 during manufacturing. Other applications could be installed subsequently or dynamically.

Applications and software may be stored on any computer readable storage medium. The computer readable storage medium may be a tangible or intransitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Further applications, including productivity applications, social media applications, games, among others, may also be loaded onto the mobile device 900 through the network 919, an auxiliary I/O subsystem 928, serial port 930, short-range communications subsystem or any other suitable subsystem 942, and installed by a user in the RAM 926 or a non-volatile store (not shown) for execution by the processor 938. Such flexibility in application installation increases the functionality of the device and may provide enhanced on-device functions, communication-related functions, or both.

In a data communication mode, a received signal such as a text message or web page download will be processed by the communication subsystem 911 and input to the processor 938, which may further process the received signal for output to the display 922, or alternatively to an auxiliary I/O device 928.

A user of mobile device 900 may also compose data items such as email messages for example, using the keyboard 932, which may be a complete alphanumeric keyboard or telephone-type keypad, either physical or virtual, among others, in conjunction with the display 922 and possibly an auxiliary I/O device 928. Such composed items may then be transmitted over a communication network through the communication subsystem 911.

For voice communications which are optional, overall operation of mobile device 900 is similar, except that received signals may typically be output to a speaker 934 and signals for transmission may be generated by a microphone 936. Alternative voice or audio I/O subsystems, such as a voice message recording subsystem, may also be implemented on mobile device 900. Although voice or audio signal output is preferably accomplished primarily through the speaker 934, display 922 may also be used to provide an indication of the identity of a calling party, the duration of a voice call, or other voice call related information for example.

Serial port 930 in FIG. 9 may be implemented in a mobile device for which synchronization with a user's desktop computer (not shown) may be desirable, but is an optional device component. Such a port 930 may enable a user to set preferences through an external device or software application and may extend the capabilities of mobile device 900 by providing for information or software downloads to mobile device 900 other than through a wireless communication network. As will be appreciated by those skilled in the art, serial port 930 can further be used to connect the mobile device to a computer to act as a modem or for charging a battery on the mobile device.

Other communications subsystems 940, such as a short-range communications subsystem, is a further optional component which may provide for communication between mobile device 900 and different systems or devices, which need not necessarily be similar devices. For example, the subsystem 940 may include an infrared device and associated circuits and components or a Bluetooth™ communication module to provide for communication with similarly enabled systems and devices. Subsystem 940 may further include non-cellular communications such as WiFi or WiMAX, or near field communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

Further, in some embodiment the clauses below may provide such modifications and variations.

AA. A method at a user equipment (UE) comprising: sending a request message to a network node, the request message containing an indication; and receiving, at the user equipment, a response message, the response message including a Uniform Resource Name (URN) including a country code.

AB. The method of clause AA, wherein the indication comprises an Access Network Query Protocol (ANQP) Emergency Call Number element.

AC. The method of clause AA, wherein the URN comprises a namespace specific string including at least one namespace identifier.

AD. The method of clause AC, wherein the at least one namespace identifier includes one or both of: the namespace identifier "3gpp" or the namespace identifier "sos-anqp".

AE. The method of clause AA wherein the URN further includes one or both of: at least one emergency number; or at least one emergency call type.

AF. The method of clause AE wherein the at least one emergency call type includes a label "sos".

AG. The method of clause AF wherein the label "sos" is followed by at least one sub-label.

AH. The method of clause AG wherein the sub-label includes one of "police", "ambulance", "fire", "marine", or "mountain".

AI. The method of clause AA, wherein the request message comprises an ANQP request message.

AJ. The method of clause AA, wherein the response message comprises an ANQP response message.

AK. The method of clause AA, wherein the URN has no emergency number, and wherein the receiving comprises overwriting a previously received list having local emergency numbers with an empty list.

AL. The method of clause AA, further comprising: detecting that the URN has no emergency number; detecting a previously received list for storing local emergency numbers; and replacing the previously received list with a list with no emergency number.

AM. The method of clause AA, further comprising: detecting that the URN has no emergency number; and storing a list with no emergency number.

AN. The method of clause AA, wherein the country code comprises an MCC, and wherein the MCC indicates a portion of a Public Land Mobile Network (PLMN) code to which the emergency number, type or category information applies.

AO. A user equipment comprising: a processor; and a communications subsystem, wherein the user equipment is configured to: send a request message to a network node, the request message containing an indication; and receive a response message, the response message including a Uniform Resource Name (URN) including a country code.

AP. The user equipment of clause AO, wherein the indication comprises an Access Network Query Protocol (ANQP) Emergency Call Number element.

AQ. The user equipment of clause AO, wherein the URN comprises a namespace specific string including at least one namespace identifier.

AR. The user equipment of clause AP, wherein the at least one namespace identifier includes one or both of: the namespace identifier "3gpp" or the namespace identifier "sos-anqp".

AS. The user equipment of clause AO wherein the URN further includes one or both of: at least one emergency number; or at least one emergency call type.

AT. The user equipment of clause AS wherein the at least one emergency call type includes a label "sos".

AU. The user equipment of clause AT wherein the label "sos" is followed by at least one sub-label.

AV. The user equipment of clause AU wherein the sub-label includes one of "police", "ambulance", "fire", "marine", or "mountain".

AW. The user equipment of clause AO, wherein the request message comprises an ANQP request message.

AX. The user equipment of clause AO, wherein the response message comprises an ANQP response message.

AY. The user equipment of clause AO, wherein the URN has no emergency number, and wherein the user equipment is configured to receive by overwriting a previously received list having local emergency numbers with an empty list.

AZ. A non-transitory computer readable medium for storing instruction code which, when executed by a processor of a user equipment, causes the user equipment to: send a request message to a network node, the request message containing an indication; and receive a response message, the response message including a uniform resource name including an empty emergency number list along with a country code.

BA. A method at a network element comprising: receiving a request message from a user equipment, the request message containing an indication; and sending, to the user equipment, a response message, the response message including a Uniform Resource Name (URN) including a country code.

BB. A network element comprising: a processor; and a communications subsystem, wherein the network element is configured to receive a request message from a user equipment, the request message containing an indication; and send, to the user equipment, a response message, the response message including a Uniform Resource Name (URN) including a country code.

BC. A non-transitory computer readable medium for storing instruction code which, when executed by a processor of a network element, causes the network element to receive a request message from a user equipment, the request message containing an indication; and send, to the user equipment, a response message, the response message including a Uniform Resource Name (URN) including a country code.

BD. A method at a network element for providing emergency codes using a non-Third Generation Partnership Project (3GPP) network, the method comprising: receiving a request message from a user equipment, the request message containing an indication; and sending, to the user equipment, a response message, the response message including at least one mobile country code (MCC), and the response message indicating an emergency number, type or category information, wherein the emergency number, type or category information is associated with the at least one MCC, and wherein the at least one MCC indicates a portion of a Public Land Mobile Network (PLMN) code to which the emergency number, type or category information applies.

BE. A network element for providing emergency codes using a non-Third Generation Partnership Project (3GPP) network, the network element comprising: a processor; and a communications subsystem, wherein the network element is configured to: receive a request message from a user equipment, the request message containing an indication; and send, to the user equipment, a response message, the response message including at least one mobile country code (MCC), and the response message indicating an emergency number, type or category information, wherein the emergency number, type or category information is associated with the at least one MCC, and wherein the at least one MCC indicates a portion of a Public Land Mobile Network (PLMN) code to which the emergency number, type or category information applies.

BF. A non-transitory computer readable medium for storing instruction code which, when executed by a processor of a network element, causes the network element to receive a request message from a user equipment, the request message containing an indication; and send, to the user equipment, a response message, the response message including at least one mobile country code (MCC), and the response message indicating an emergency number, type or category information, wherein the emergency number, type or category information is associated with the at least one MCC, and wherein the at least one MCC indicates a portion of a Public Land Mobile Network (PLMN) code to which the emergency number, type or category information applies.

The invention claimed is:

1. A method using Internet Key Exchange Protocol version 2 (IKEv2) procedures at an evolved packet data gateway (ePDG) for providing emergency numbers, the method comprising:
   receiving an IKEv2 request message comprising a request for emergency number information from a user equipment (UE); and
   transmitting to the user equipment an IKEv2 response message, the IKEv2 response message including an indicator of an empty list of emergency numbers and a mobile country code (MCC), and wherein the IKEv2 response message causes the UE to overwrite a previously received list of local emergency numbers.

2. The method of claim 1, wherein the IKEv2 request message is an IKE_AUTH request.

3. The method of claim 1, wherein the IKEv2 request message comprises a CFG_REQUEST configuration payload.

4. The method of claim 1, wherein the IKEv2 response message is an IKE_AUTH response.

5. The method of claim 1, wherein the IKEv2 response message comprises a CFG_REPLY configuration payload.

6. An evolved packet data gateway (ePDG) comprising:
   a processor;
   a communication subsystem supporting the Internet Key Exchange Protocol version 2 (IKEv2) for providing emergency numbers, wherein the ePDG is configured to:
      receive a request message comprising a request for emergency number information from a user equipment (UE); and
      transmit to the user equipment, a response message, the response message including an indicator of an empty list of emergency numbers and a mobile country code (MCC), wherein the response message causes the UE to overwrite a previously received list of local emergency numbers.

7. The ePDG of claim 6, wherein the IKEv2 request message is an IKE_AUTH request.

8. The ePDG of claim 6, wherein the IKEv2 request message comprises a CFG_REQUEST configuration payload.

9. The ePDG of claim 6, wherein the IKEv2 response message is an IKE_AUTH response.

10. The ePDG of claim 6, wherein the IKEv2 response message comprises a CFG_REPLY configuration payload.

11. A non-transitory computer-readable medium containing instructions which, when executed, cause an evolved packet data gateway (ePDG) to perform operations comprising:
   receiving a request message comprising a request for emergency number information from a user equipment (UE); and
   transmitting to the user equipment, a response message, the response message including an indicator of an empty list of emergency numbers and a mobile country code (MCC), wherein the response message causes the UE to overwrite a previously received list of local emergency numbers.

12. The non-transitory computer-readable medium of claim 11, wherein the IKEv2 request message is an IKE_AUTH request.

13. The non-transitory computer-readable medium of claim 11, wherein the IKEv2 request message comprises a CFG_REQUEST configuration payload.

14. The non-transitory computer-readable medium of claim 11, wherein the IKEv2 response message is an IKE_AUTH response.

15. The non-transitory computer-readable medium of claim 11, wherein the IKEv2 response message comprises a CFG_REPLY configuration payload.

* * * * *